US009952446B2

(12) United States Patent
Abe

(10) Patent No.: US 9,952,446 B2
(45) Date of Patent: Apr. 24, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Hirofumi Abe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 301 days.

(21) Appl. No.: 14/976,229

(22) Filed: Dec. 21, 2015

(65) Prior Publication Data

US 2016/0187627 A1    Jun. 30, 2016

(30) Foreign Application Priority Data

Dec. 24, 2014  (JP) ................. 2014-259746
Dec. 24, 2014  (JP) ................. 2014-259747

(51) Int. Cl.
  *G02B 15/16*   (2006.01)
  *G02B 27/64*   (2006.01)
  *G02B 15/173*  (2006.01)

(52) U.S. Cl.
  CPC ......... *G02B 27/646* (2013.01); *G02B 15/173* (2013.01)

(58) Field of Classification Search
  CPC .... G02B 15/14; G02B 15/167; G02B 15/173; G02B 15/177; G02B 15/20; G02B 15/24; G02B 15/28; G02B 13/009; G02B 13/0045; G02B 13/00; G02B 13/34; G02B 27/0025; G02B 27/646
  See application file for complete search history.

(56) References Cited

U.S. PATENT DOCUMENTS 9,116,330 B2   8/2015   Abe
9,250,426 B2   2/2016   Abe
(Continued)

FOREIGN PATENT DOCUMENTS

CN   101046551 A   10/2007
CN   102129118 A   7/2011
(Continued)

OTHER PUBLICATIONS

U.S. Appl. No. 14/944,555, filed Nov. 18, 2015, inventor Abe.
(Continued)

*Primary Examiner* — Bumsuk Won
*Assistant Examiner* — Ephrem Mebrahtu
(74) *Attorney, Agent, or Firm* — Carter, DeLuca, Farrell & Schmidt, LLP

(57) ABSTRACT

Provided is a zoom lens, comprising, in order from object side to image side: first positive, second negative and third positive lens units and a rear lens group including at least one lens unit, in which: at telephoto end as compared to wide angle end, an interval between first and second lens units is increased, and an interval between second and third lens units is reduced; an interval between adjacent lens units is changed during zooming; the first lens unit consists, in order from object side to image side, of a first positive lens sub-unit, and a second negative lens sub-unit over a widest air interval; and a focal length ft of zoom lens at telephoto end, a focal length f1a of first lens sub-unit, a lateral magnification β1b of second lens sub-unit, and a lateral magnification β2t of second lens unit at telephoto end are appropriately set.

34 Claims, 19 Drawing Sheets

(56) References Cited

U.S. PATENT DOCUMENTS

| | | | |
|---|---|---|---|
| 2013/0229565 A1* | 9/2013 | Hatakeyama | G02B 15/173 348/345 |
| 2014/0268365 A1* | 9/2014 | Nishio | G02B 15/173 359/683 |
| 2015/0253545 A1 | 9/2015 | Abe | |
| 2016/0306186 A1* | 10/2016 | Fujikura | G02B 27/646 |

FOREIGN PATENT DOCUMENTS

| | | |
|---|---|---|
| CN | 104049346 A | 9/2014 |
| CN | 104076495 B | 4/2017 |
| JP | H09325274 A | 12/1997 |
| JP | 2007-328006 A | 12/2007 |
| JP | 2012-047814 A | 3/2012 |

OTHER PUBLICATIONS

Chinese Office Action with english translation issued in corresponding application No. 201510964946.4 dated Sep. 4, 2017, 9 pages.

\* cited by examiner

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup apparatus using a solid-state image pickup element, such as a video camera, an electronic still camera, a broadcasting camera, and a monitoring camera, or an image pickup apparatus such as a silver-halide film camera.

Description of the Related Art

In recent years, an image pickup apparatus using a solid-state image pickup element has high functionality and a small size as an entire apparatus. As an image pickup optical system used with such image pickup apparatus, a zoom lens having a high zoom ratio, which is short in total length of the zoom lens, small in size, and bright with a large aperture has been sought for.

As a zoom lens that satisfies those requirements, there has been known a positive-lead type zoom lens including, in order from an object side to an image side, first, second, and third lens units having positive, negative, and positive refractive powers, and a rear lens group that follows, which includes at least one lens unit. As the positive-lead type zoom lens, there has been known a four-unit zoom lens including, in order from the object side to the image side, four lens units having positive, negative, positive, and positive refractive powers. In Japanese Patent Application Laid-Open No. 2007-328006, a positive-lead type four-unit zoom lens in which the second lens unit and the fourth lens unit are configured to move during zooming is disclosed.

As the positive-lead type zoom lens, there has also been known a five-unit zoom lens including, in order from the object side to the image side, lens units having positive, negative, positive, negative, and positive refractive powers. In Japanese Patent Application Laid-Open No. H09-325274, a five-unit zoom lens in which the second lens unit to the fifth lens unit are configured to move during zooming is disclosed. Moreover, in Japanese Patent Application Laid-Open No. 2012-47814, a five-unit zoom lens in which the second lens unit to the fourth lens unit are configured to move during zooming is disclosed.

The positive-lead type four-unit zoom lens and five-unit zoom lens described above are relatively easy to realize the high zoom ratio while downsizing an entire system. However, in order to obtain high optical characteristics while realizing a large aperture ratio and the high zoom ratio, it is important to appropriately set the refractive powers of the respective lens units forming the zoom lens, movement conditions of the respective lens units during zooming, and the like.

In addition, it is important to appropriately set a position of an aperture stop, lens structures of the lens units on the object side of the aperture stop, and the like. For example, it is important to appropriately set the refractive power and the lens structure of the first lens unit, an imaging magnification of the second lens unit for magnification varying, and the like. When those structures are not appropriately set, it becomes difficult to obtain the high optical characteristics over the entire zoom range while realizing the large aperture ratio, a long focal length at a telephoto end, and the high zoom ratio.

SUMMARY OF THE INVENTION

According to one embodiment of the present invention, there is provided a zoom lens, comprising, in order from an object side to an image side: a first lens unit having a positive refractive power; a second lens unit having a negative refractive power; a third lens unit having a positive refractive power; and a rear lens group including at least one lens unit, in which: at a telephoto end as compared to a wide angle end, an interval between the first lens unit and the second lens unit is increased, and an interval between the second lens unit and the third lens unit is reduced; an interval between adjacent lens units is changed during zooming; the first lens unit consists, in order from the object side to the image side, of a first lens sub-unit having a positive refractive power, and a second lens sub-unit having a negative refractive power over a widest air interval in the first lens unit; and the following conditional expressions are satisfied:

$$0.10 < f1a/ft < 0.60; \text{ and}$$

$$-0.70 < \beta 1b/\beta 2t < -0.20,$$

where ft represents a focal length of the zoom lens at the telephoto end, f1a represents a focal length of the first lens sub-unit, $\beta 1b$ represents a lateral magnification of the second lens sub-unit, and $\beta 2t$ represents a lateral magnification of the second lens unit at the telephoto end.

Further, according to another embodiment of the present invention, there is provided a zoom lens, comprising, in order from an object side to an image side: a first lens unit having a positive refractive power; a second lens unit having a negative refractive power; a third lens unit having a positive refractive power; a fourth lens unit having a negative refractive power; and a fifth lens unit having a positive refractive power, in which: at a telephoto end as compared to a wide angle end, an interval between the first lens unit and the second lens unit is increased, an interval between the second lens unit and the third lens unit is reduced, an interval between the third lens unit and the fourth lens unit is changed, and an interval between the fourth lens unit and the fifth lens unit is changed; in the first lens unit, a first positive lens having a convex surface on the object side is arranged closest to the object side, and a lens arranged closest to the image side in the first lens unit has a concave surface on the image side; and the following conditional expressions are satisfied:

$$-10.0 < f1/f2 < -4.5; \text{ and}$$

$$-10.0 < \beta 2t < -2.0,$$

where f1 represents a focal length of the first lens unit, f2 represents a focal length of the second lens unit, and $\beta 2t$ represents a lateral magnification of the second lens unit at the telephoto end.

Further features of the present invention will become apparent from the following description of exemplary embodiments with reference to the attached drawings.

DESCRIPTION OF THE EMBODIMENTS

Now, a zoom lens and an image pickup apparatus including the same of the present invention are described with reference to the attached drawings. The zoom lens of the present invention includes, in order from an object side to an image side, a first lens unit having a positive refractive power, a second lens unit having a negative refractive power, a third lens unit having a positive refractive power, and a rear lens group including at least one lens unit.

At a telephoto end as compared to a wide angle end, an interval between the first lens unit and the second lens unit is increased, and an interval between the second lens unit and the third lens unit is reduced. During zooming, an interval between adjacent lens units is changed. The first lens unit consists, in order from the object side to the image side, of a first lens sub-unit having a positive refractive power, and a second lens sub-unit having a negative refractive power over the widest air interval.

Figure 1:
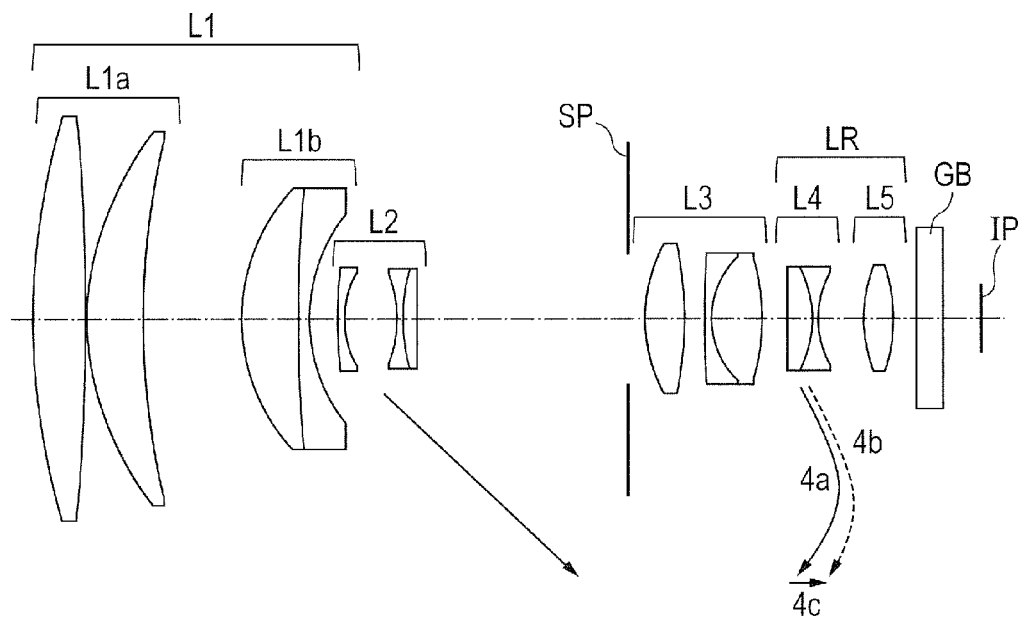
FIG. 1 is a lens cross-sectional view at a wide angle end of a zoom lens according to Example 1 of the present invention.
Figure 2A:
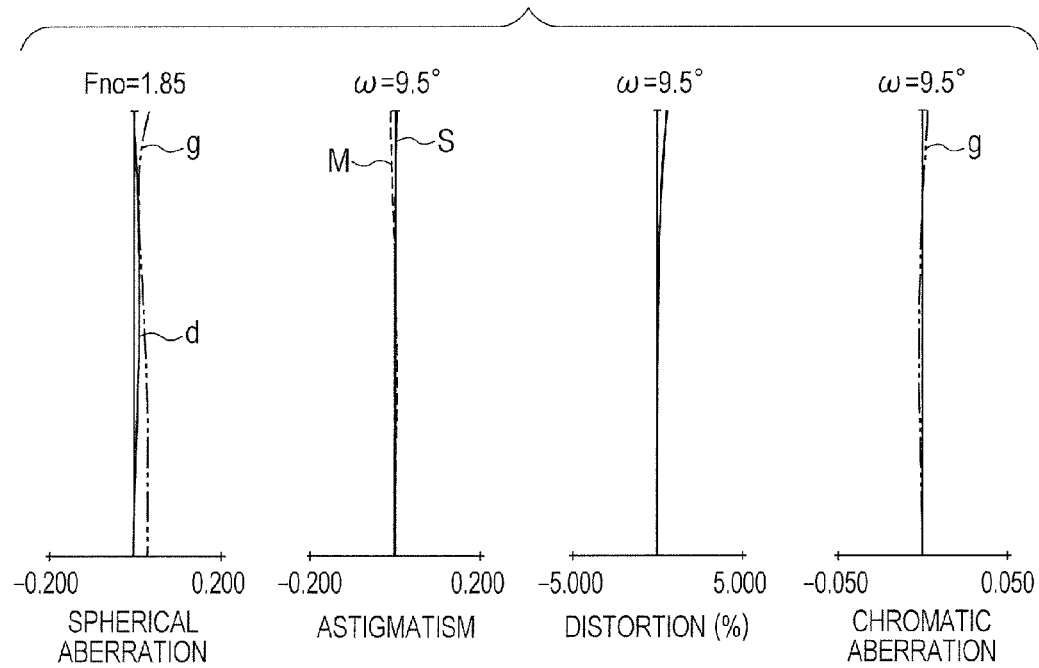
FIG. 2A is an aberration diagram at the wide angle end of the zoom lens of Example 1.
Figure 2B:
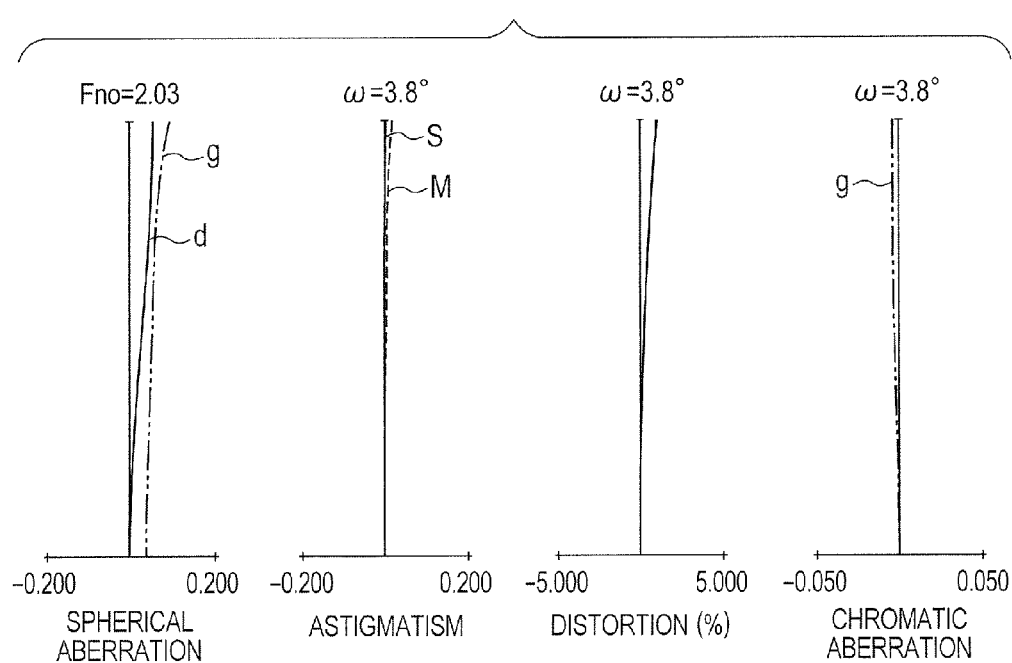
FIG. 2B is an aberration diagram at an intermediate zoom position of the zoom lens of Example 1.
Figure 2C:
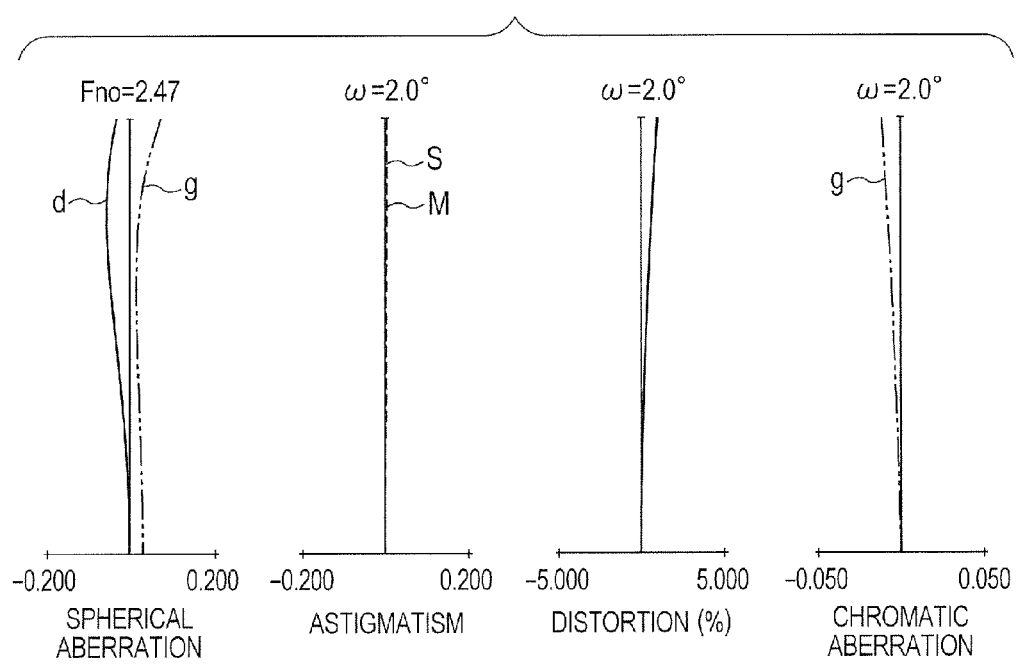
FIG. 2C is an aberration diagram at a telephoto end of the zoom lens of Example 1.

FIG. 1 is a lens cross-sectional view at a wide angle end (short focal length end) of a zoom lens according to Example 1 of the present invention. FIGS. 2A, 2B, and 2C are aberration diagrams at the wide angle end, an intermediate zoom position, and a telephoto end (long focal length end), respectively, of the zoom lens of Example 1. The zoom lens of Example 1 has a zoom ratio of 4.81 and an aperture ratio (f-number) of from 1.85 to 2.47.

Figure 3:
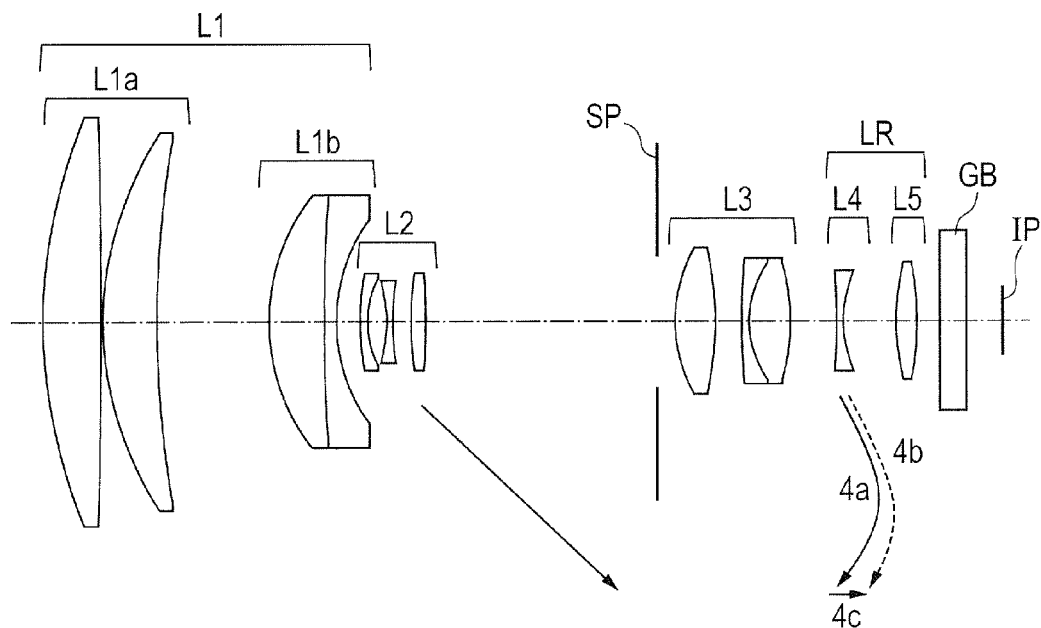
FIG. 3 is a lens cross-sectional view at a wide angle end of a zoom lens according to Example 2 of the present invention.
Figure 4A:
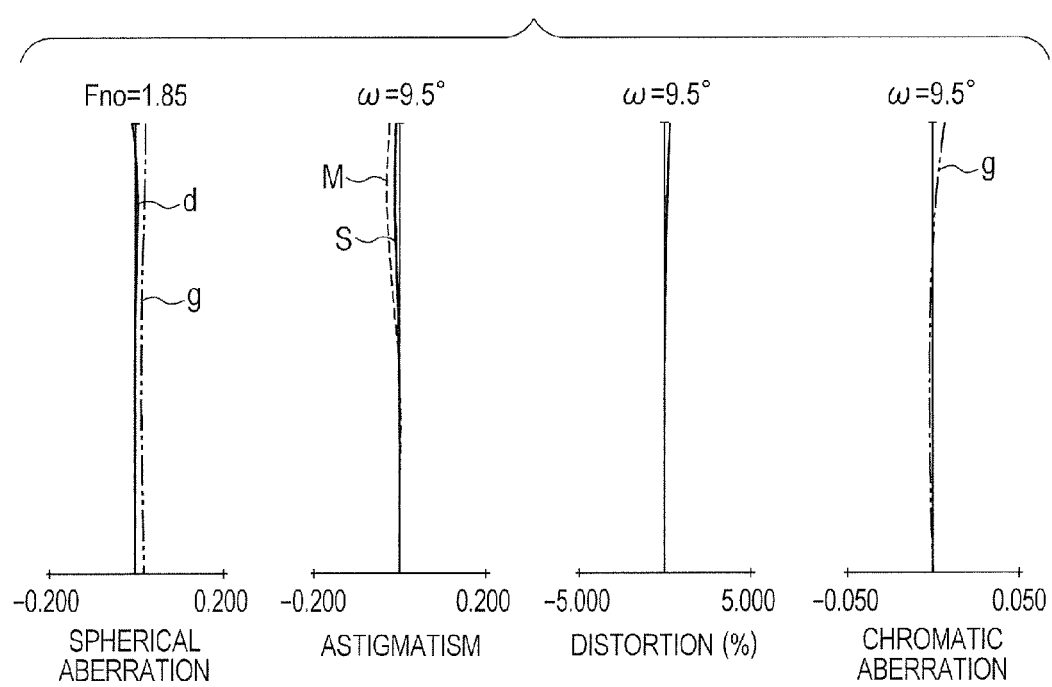
FIG. 4A is an aberration diagram at the wide angle end of the zoom lens of Example 2.
Figure 4B:
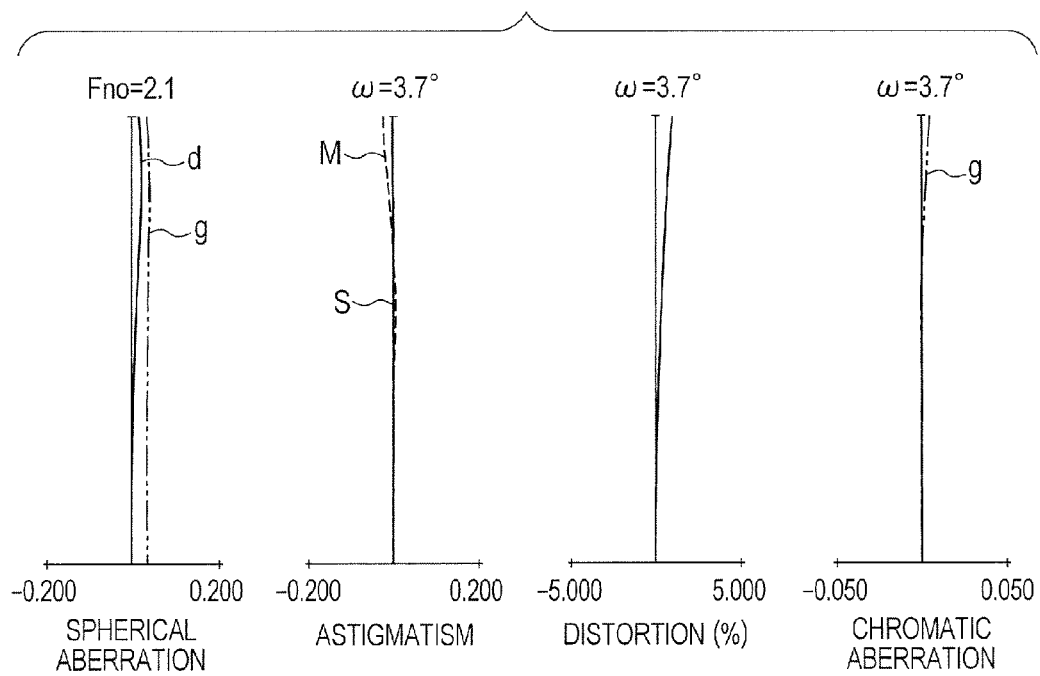
FIG. 4B is an aberration diagram at an intermediate zoom position of the zoom lens of Example 2.
Figure 4C:
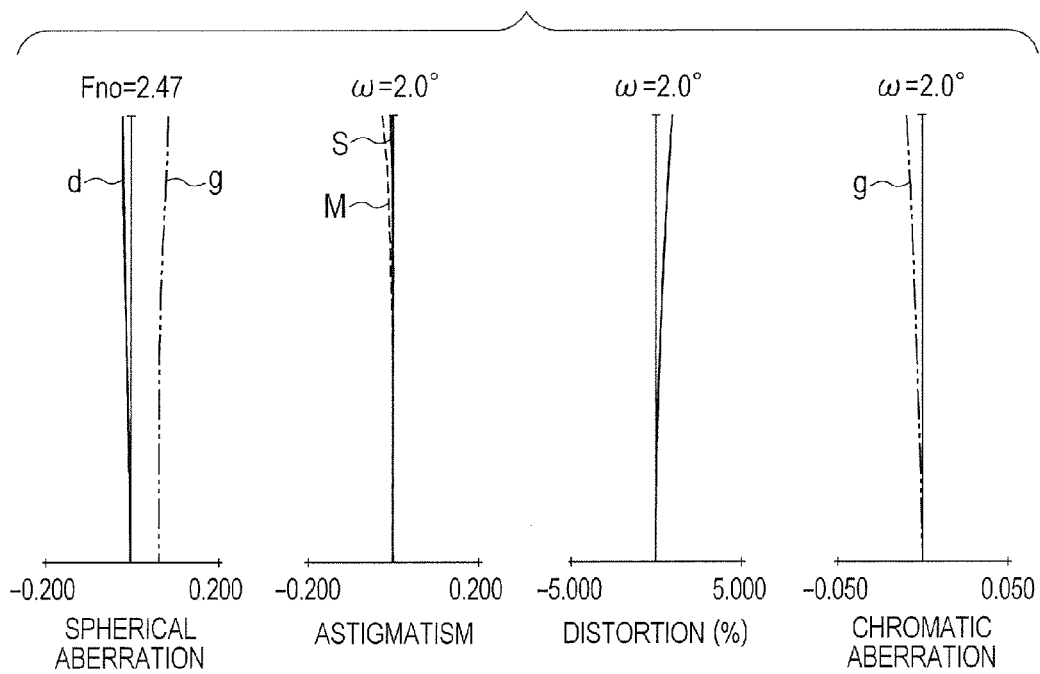
FIG. 4C is an aberration diagram at a telephoto end of the zoom lens of Example 2.

FIG. 3 is a lens cross-sectional view at a wide angle end of a zoom lens according to Example 2 of the present invention. FIGS. 4A, 4B, and 4C are aberration diagrams at the wide angle end, an intermediate zoom position, and a telephoto end, respectively, of the zoom lens of Example 2. The zoom lens of Example 2 has a zoom ratio of 4.80 and an aperture ratio of from 1.85 to 2.47.

Figure 5:
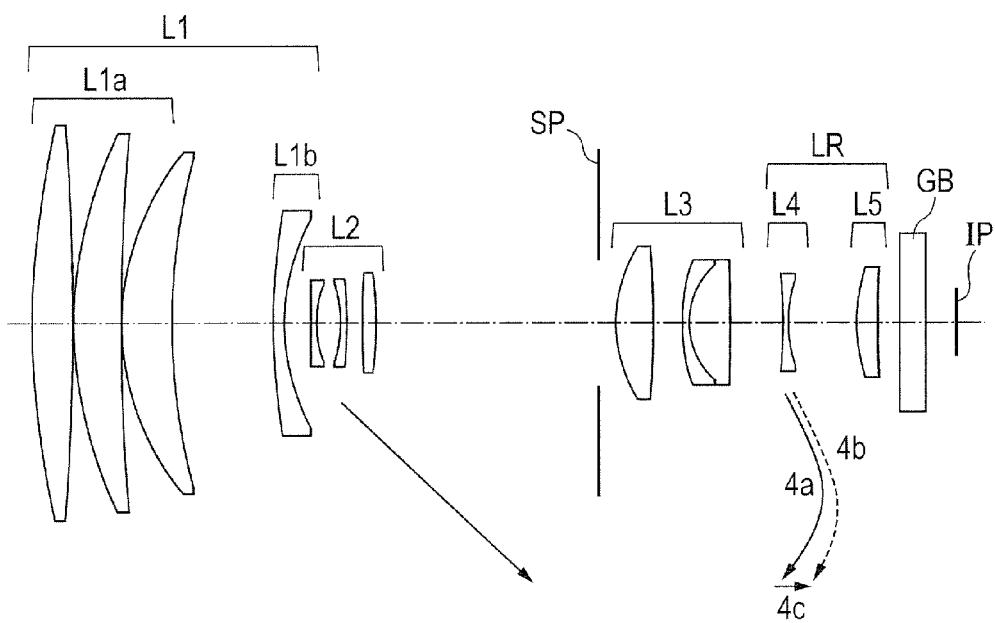
FIG. 5 is a lens cross-sectional view at a wide angle end of a zoom lens according to Example 3 of the present invention.
Figure 6A:
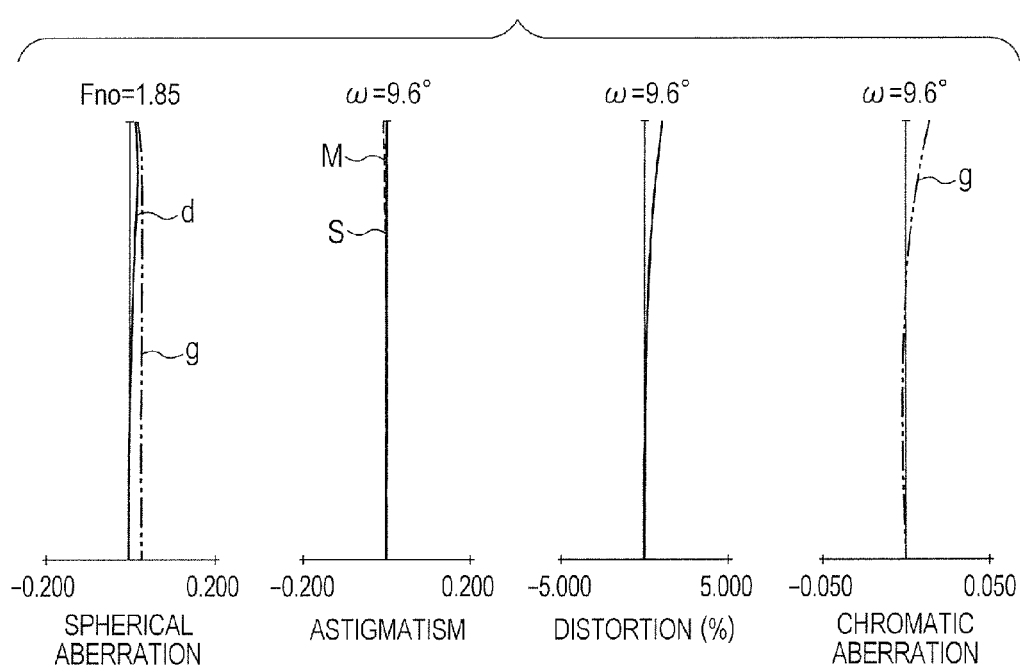
FIG. 6A is an aberration diagram at the wide angle end of the zoom lens of Example 3.
Figure 6B:
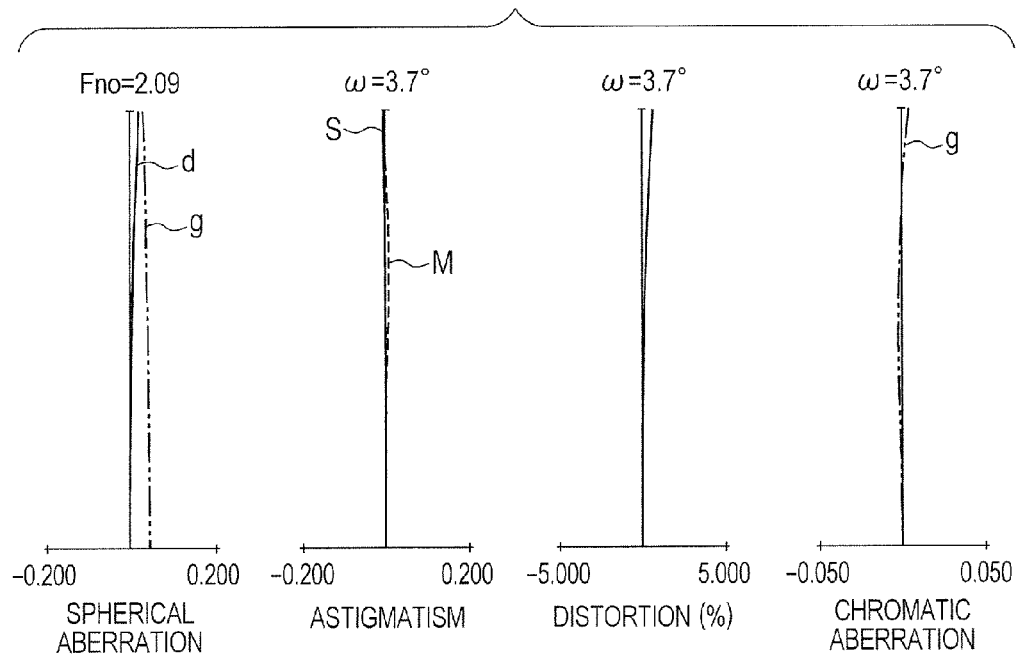
FIG. 6B is an aberration diagram at an intermediate zoom position of the zoom lens of Example 3.
Figure 6C:
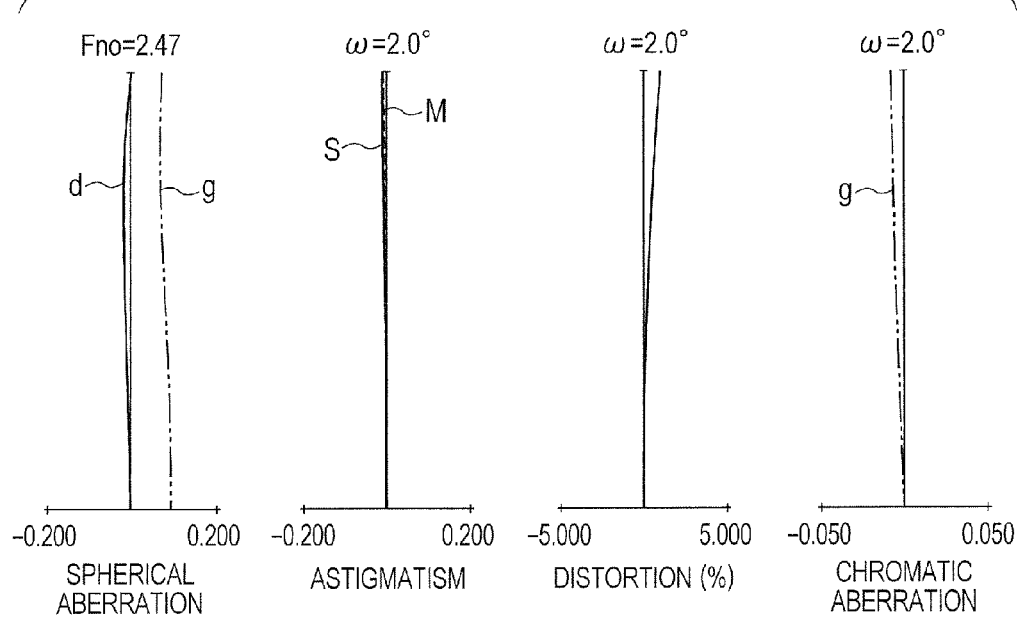
FIG. 6C is an aberration diagram at a telephoto end of the zoom lens of Example 3.

FIG. 5 is a lens cross-sectional view at a wide angle end of a zoom lens according to Example 3 of the present invention. FIGS. 6A, 6B, and 6C are aberration diagrams at the wide angle end, an intermediate zoom position, and a telephoto end, respectively, of the zoom lens of Example 3. The zoom lens of Example 3 has a zoom ratio of 4.81 and an aperture ratio of from 1.85 to 2.47.

Figure 7:
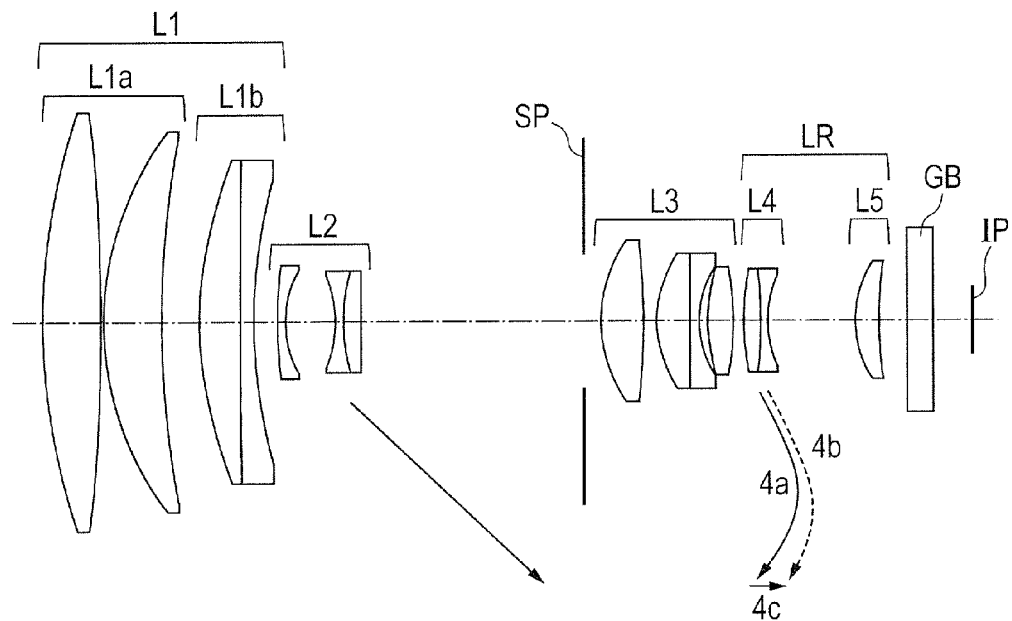
FIG. 7 is a lens cross-sectional view at a wide angle end of a zoom lens according to Example 4 of the present invention.
Figure 8A:
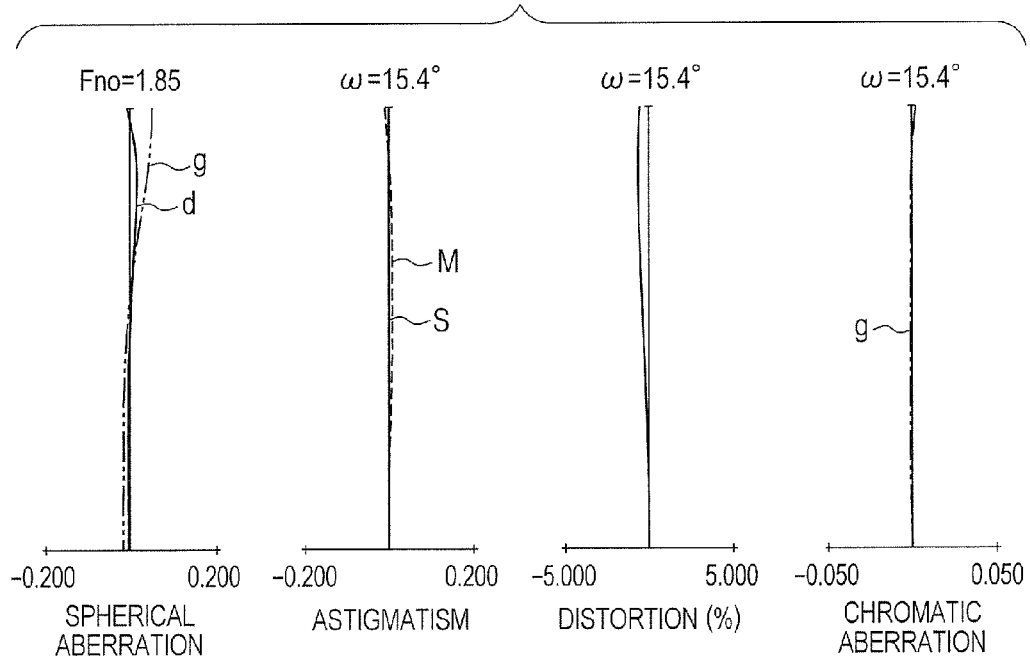
FIG. 8A is an aberration diagram at the wide angle end of the zoom lens of Example 4.
Figure 8B:
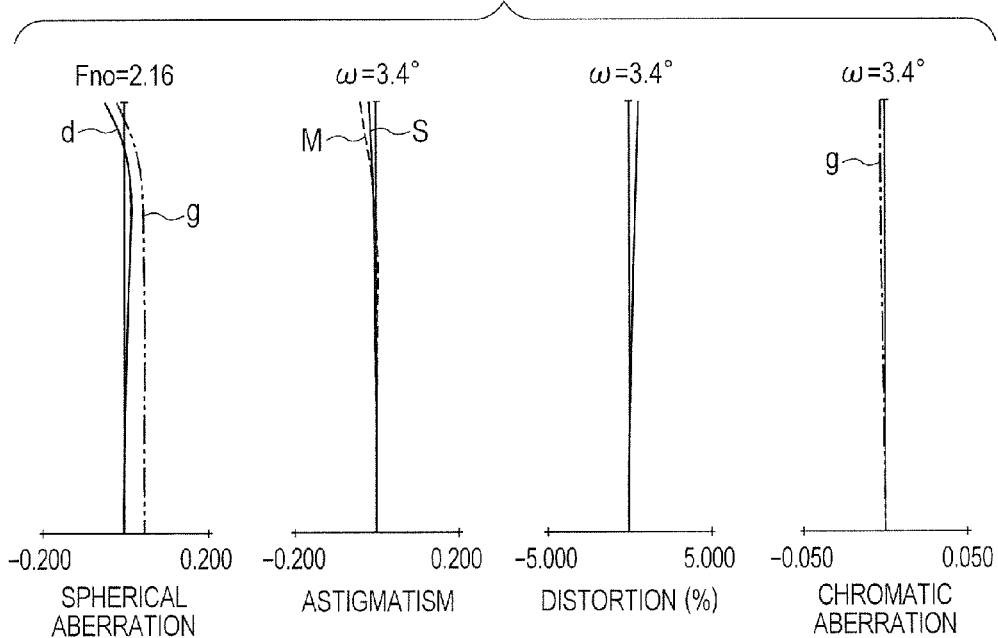
FIG. 8B is an aberration diagram at an intermediate zoom position of the zoom lens of Example 4.
Figure 8C:
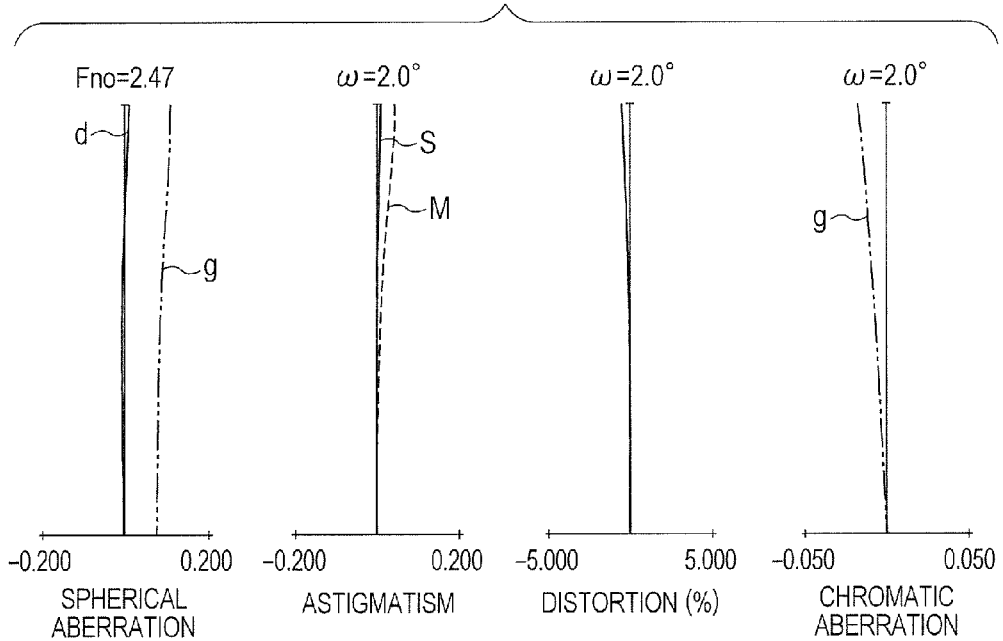
FIG. 8C is an aberration diagram at a telephoto end of the zoom lens of Example 4.

FIG. 7 is a lens cross-sectional view at a wide angle end of a zoom lens according to Example 4 of the present invention. FIGS. 8A, 8B, and 8C are aberration diagrams at the wide angle end, an intermediate zoom position, and a telephoto end, respectively, of the zoom lens of Example 4. The zoom lens of Example 4 has a zoom ratio of 7.95 and an aperture ratio of from 1.85 to 2.47.

Figure 9:
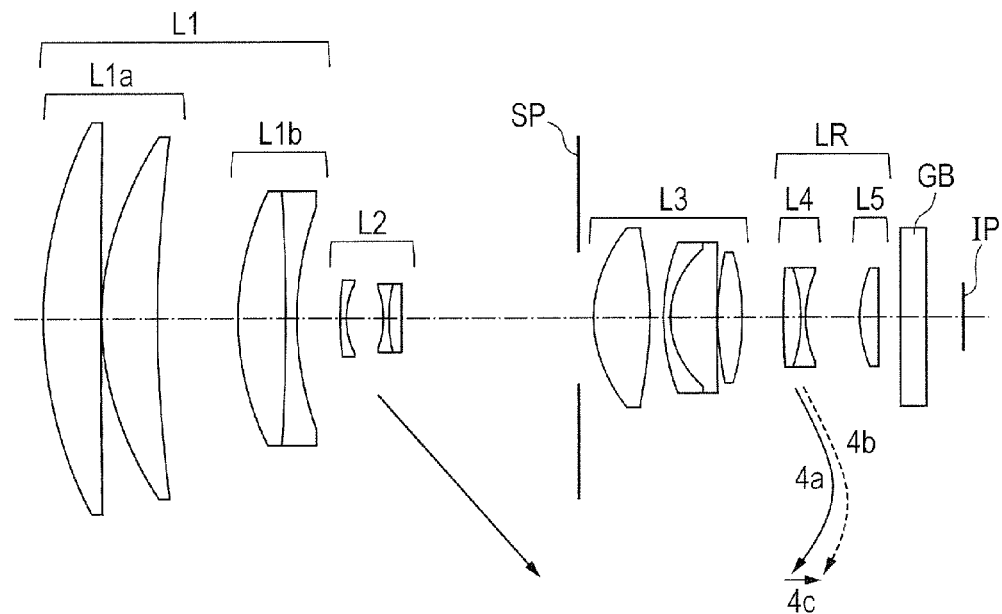
FIG. 9 is a lens cross-sectional view at a wide angle end of a zoom lens according to Example 5 of the present invention.
Figure 10A:
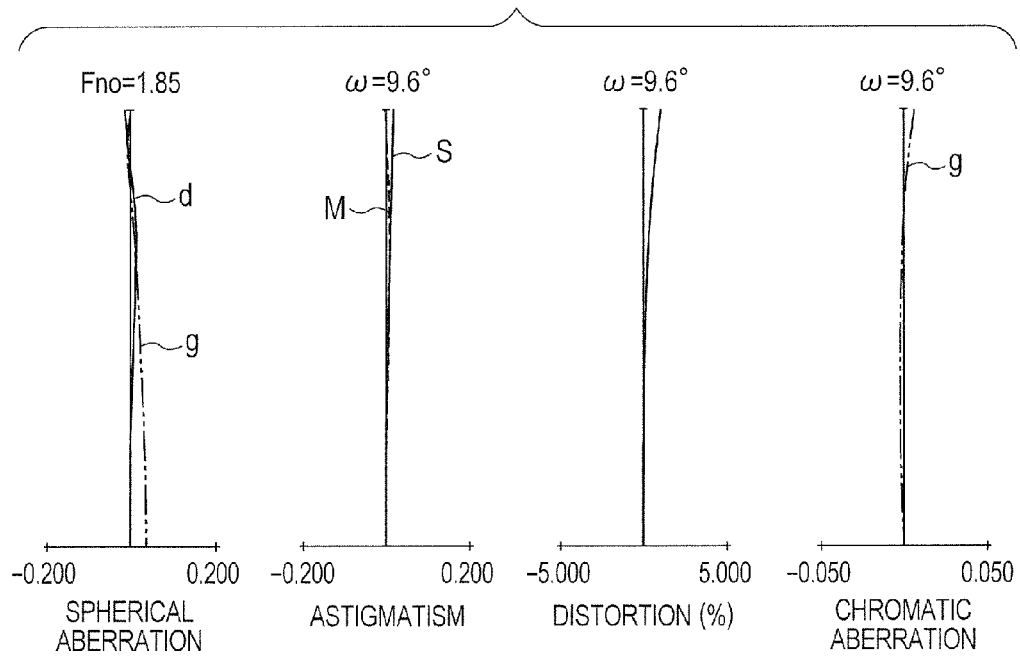
FIG. 10A is an aberration diagram at the wide angle end of the zoom lens of Example 5.
Figure 10B:
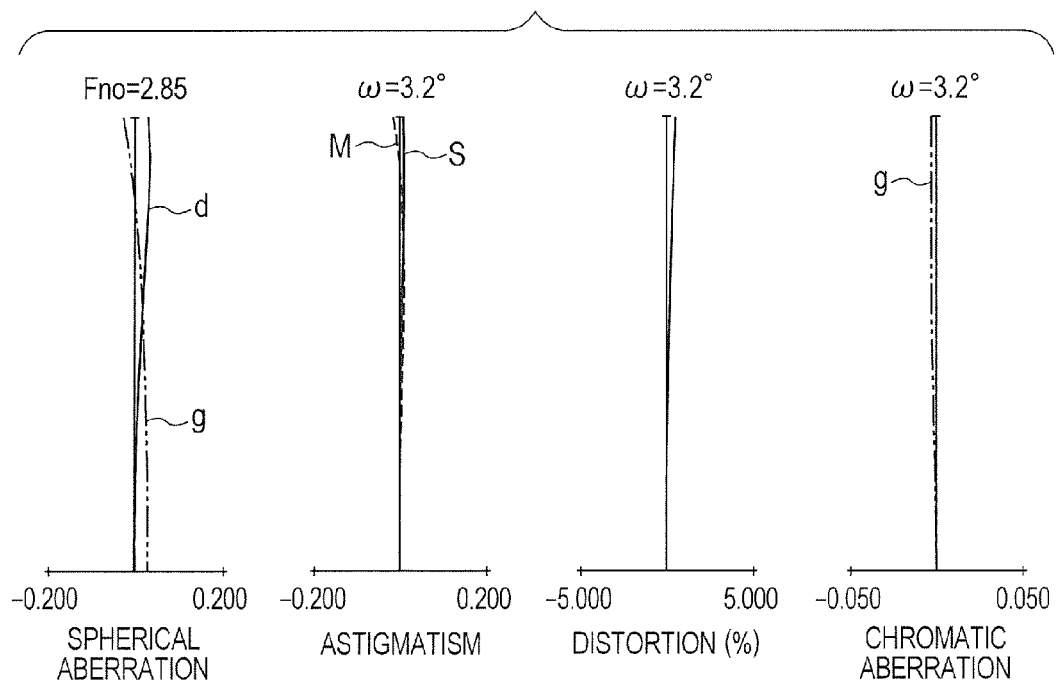
FIG. 10B is an aberration diagram at an intermediate zoom position of the zoom lens of Example 5.
Figure 10C:
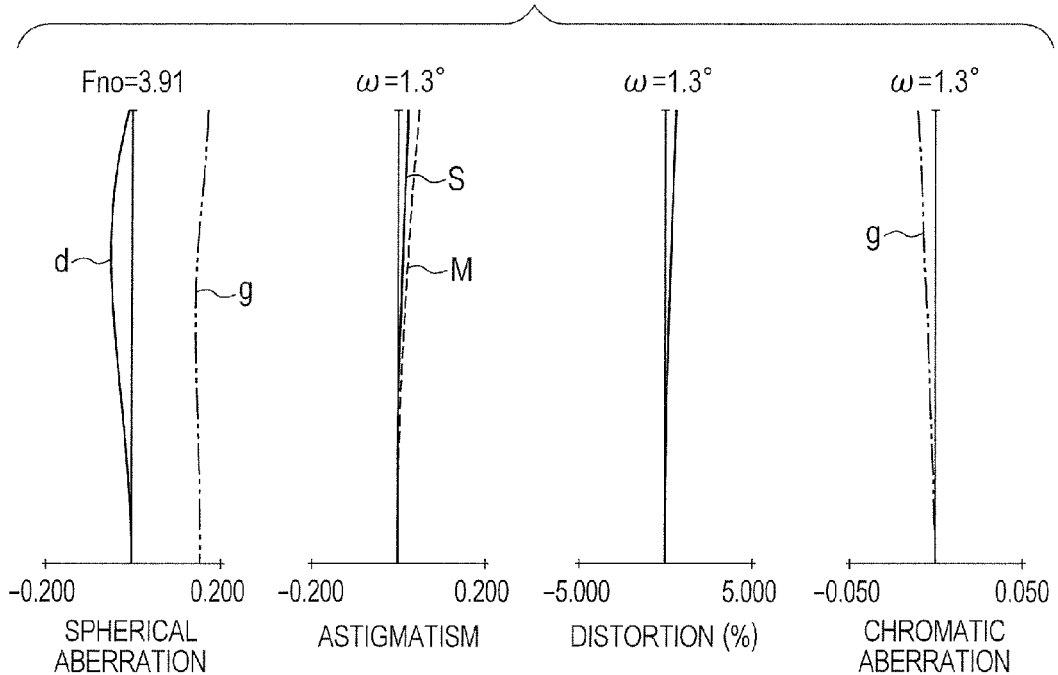
FIG. 10C is an aberration diagram at a telephoto end of the zoom lens of Example 5.

FIG. 9 is a lens cross-sectional view at a wide angle end of a zoom lens according to Example 5 of the present invention. FIGS. 10A, 10B, and 10C are aberration diagrams at the wide angle end, an intermediate zoom position, and a telephoto end, respectively, of the zoom lens of Example 5. The zoom lens of Example 5 has a zoom ratio of 7.69 and an aperture ratio of from 1.85 to 3.91.

Figure 11:
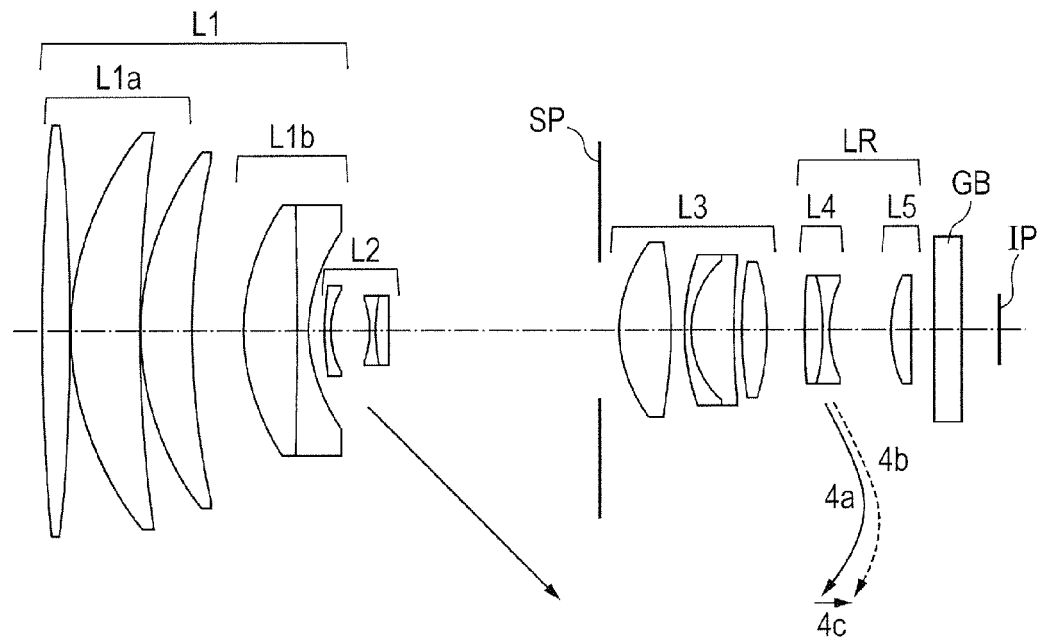
FIG. 11 is a lens cross-sectional view at a wide angle end of a zoom lens according to Example 6 of the present invention.
Figure 12A:
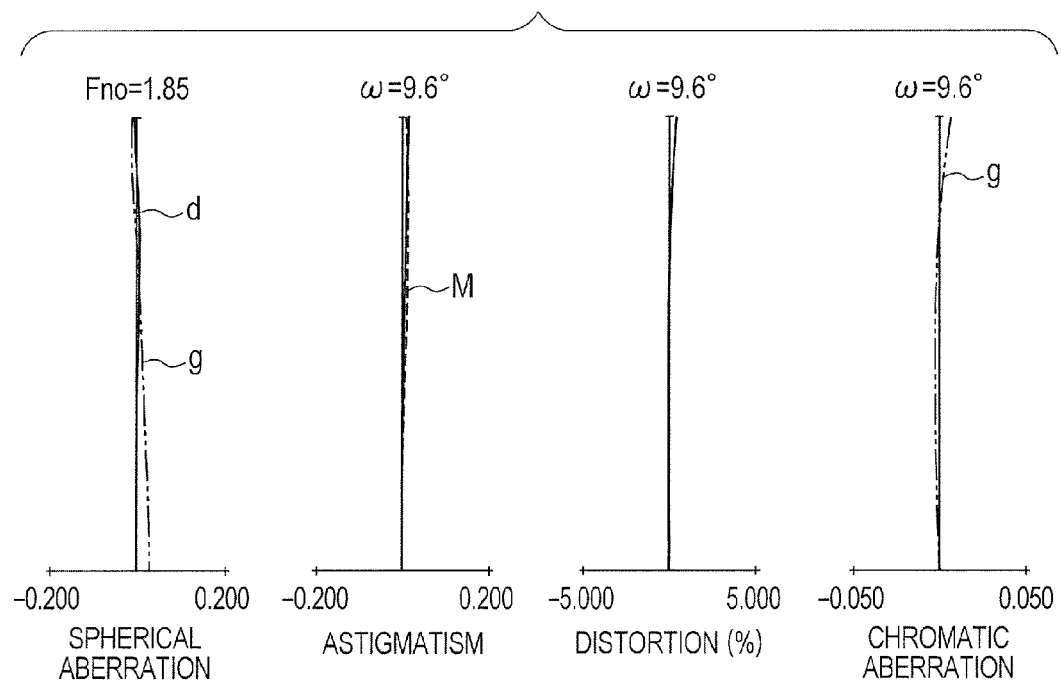
FIG. 12A is an aberration diagram at the wide angle end of the zoom lens of Example 6.
Figure 12B:
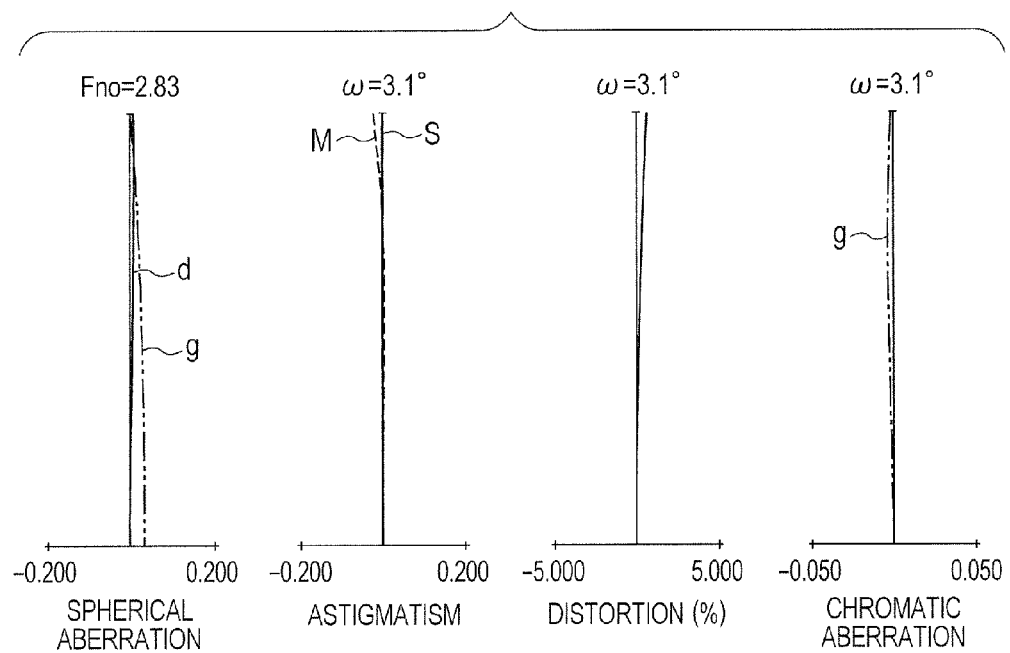
FIG. 12B is an aberration diagram at an intermediate zoom position of the zoom lens of Example 6.
Figure 12C:
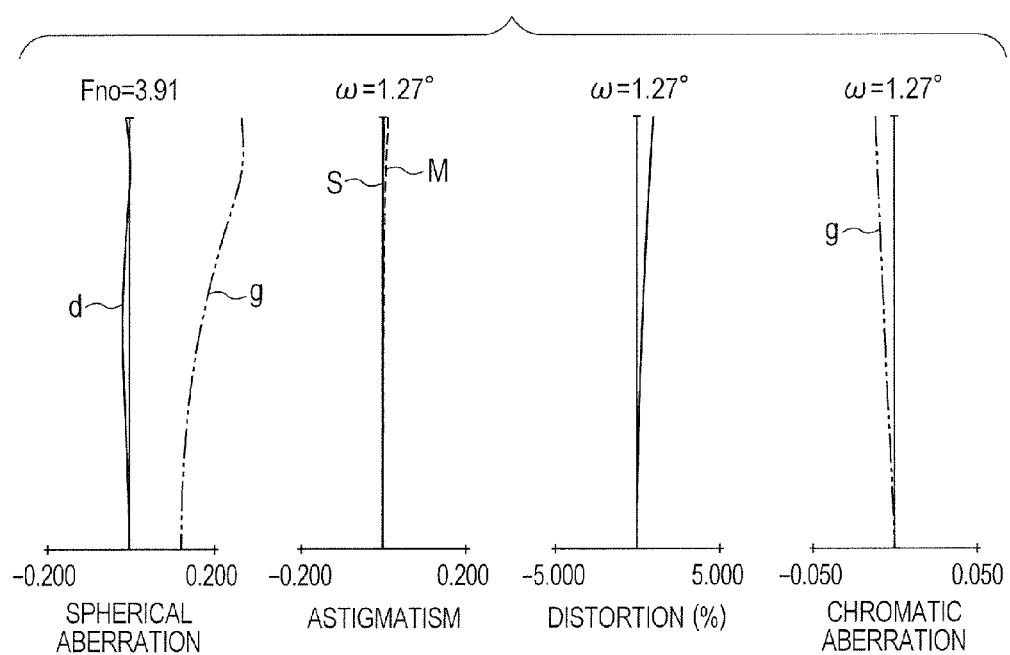
FIG. 12C is an aberration diagram at a telephoto end of the zoom lens of Example 6.

FIG. 11 is a lens cross-sectional view at a wide angle end of a zoom lens according to Example 6 of the present invention. FIGS. 12A, 12B, and 12C are aberration diagrams at the wide angle end, an intermediate zoom position, and a telephoto end, respectively, of the zoom lens of Example 6.

The zoom lens of Example 6 has a zoom ratio of 7.69 and an aperture ratio of from 1.85 to 3.91.

Figure 13:
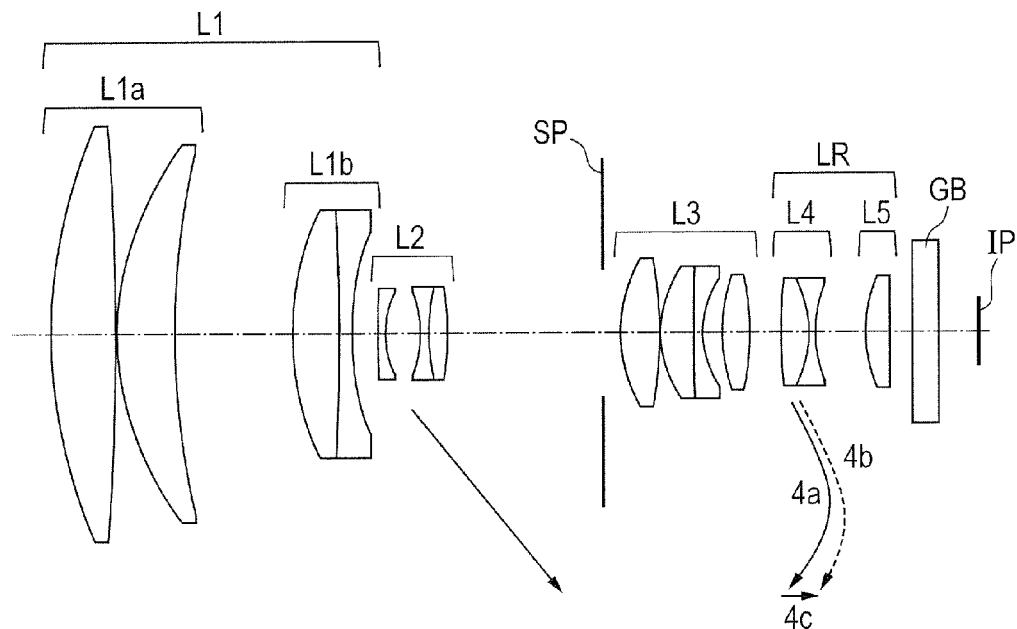
FIG. 13 is a lens cross-sectional view at a wide angle end of a zoom lens according to Example 7 of the present invention.
Figure 14A:
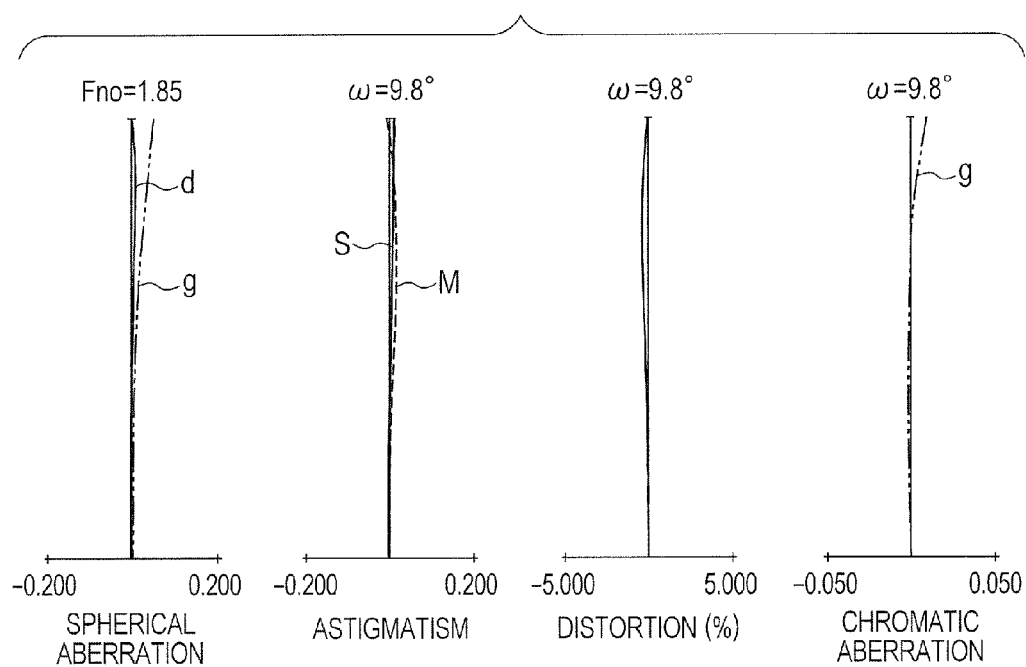
FIG. 14A is an aberration diagram at the wide angle end of the zoom lens of Example 7.
Figure 14B:
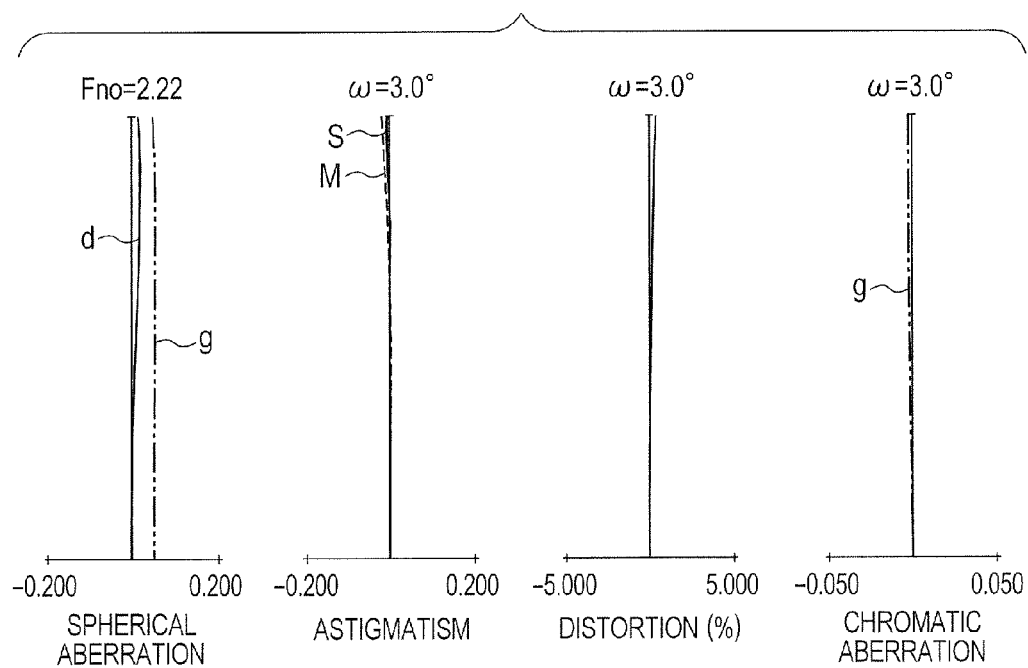
FIG. 14B is an aberration diagram at an intermediate zoom position of the zoom lens of Example 7.
Figure 14C:
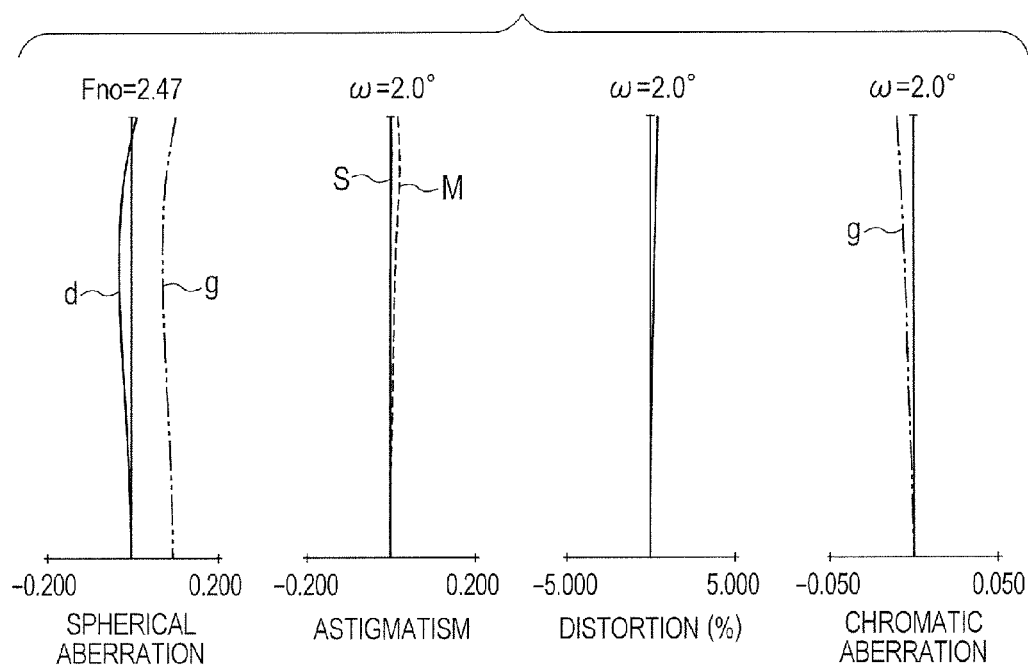
FIG. 14C is an aberration diagram at a telephoto end of the zoom lens of Example 7.

FIG. 13 is a lens cross-sectional view at a wide angle end of a zoom lens according to Example 7 of the present invention. FIGS. 14A, 14B, and 14C are aberration diagrams at the wide angle end, an intermediate zoom position, and a telephoto end, respectively, of the zoom lens of Example 7. The zoom lens of Example 7 has a zoom ratio of 4.95 and an aperture ratio of from 1.85 to 2.47.

Figure 15:
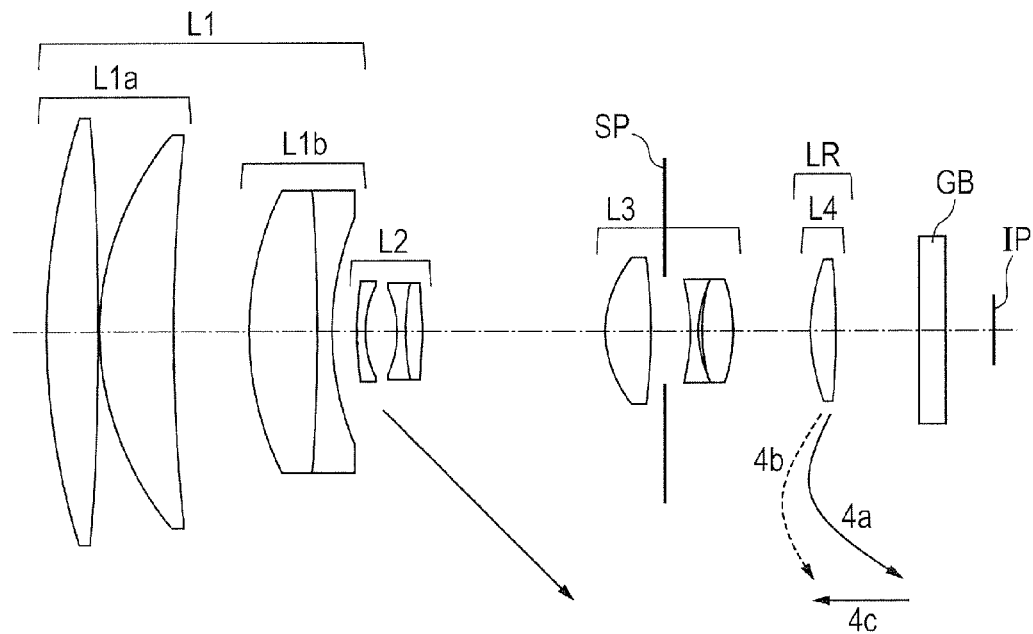
FIG. 15 is a lens cross-sectional view at a wide angle end of a zoom lens according to Example 8 of the present invention.
Figure 16A:
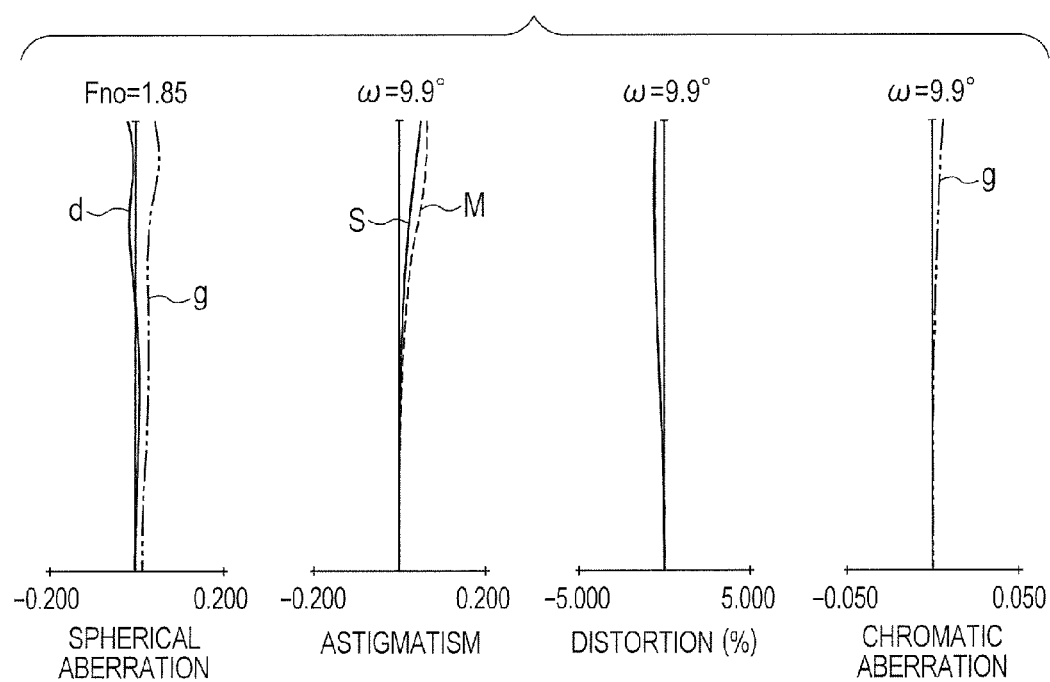
FIG. 16A is an aberration diagram at the wide angle end of the zoom lens of Example 8.
Figure 16B:
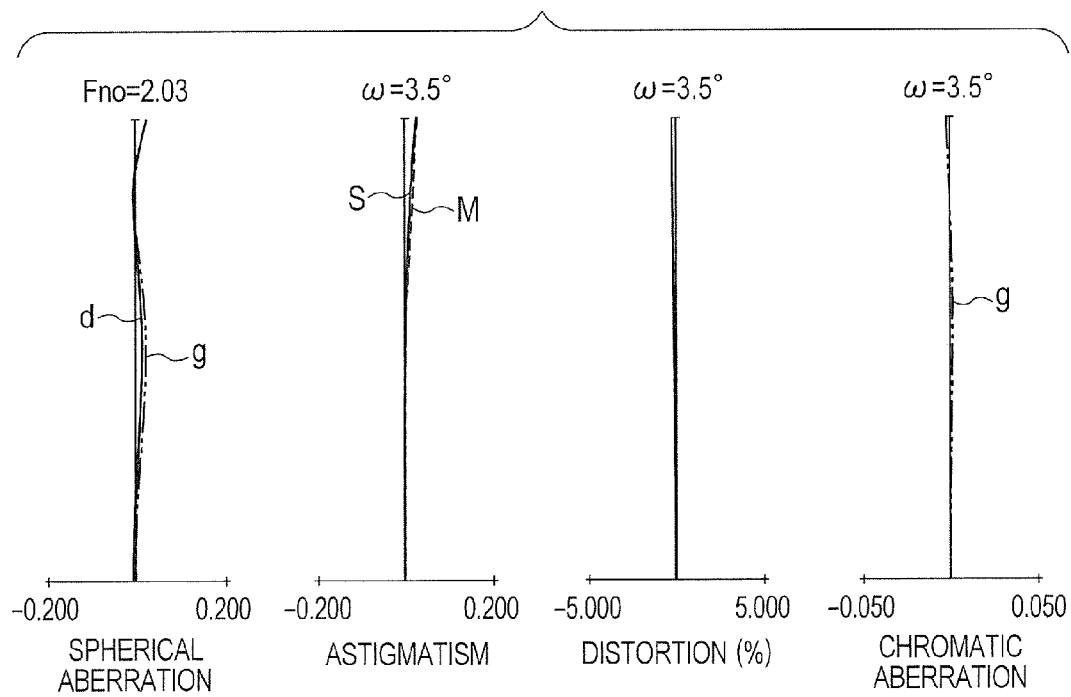
FIG. 16B is an aberration diagram at an intermediate zoom position of the zoom lens of Example 8.
Figure 16C:
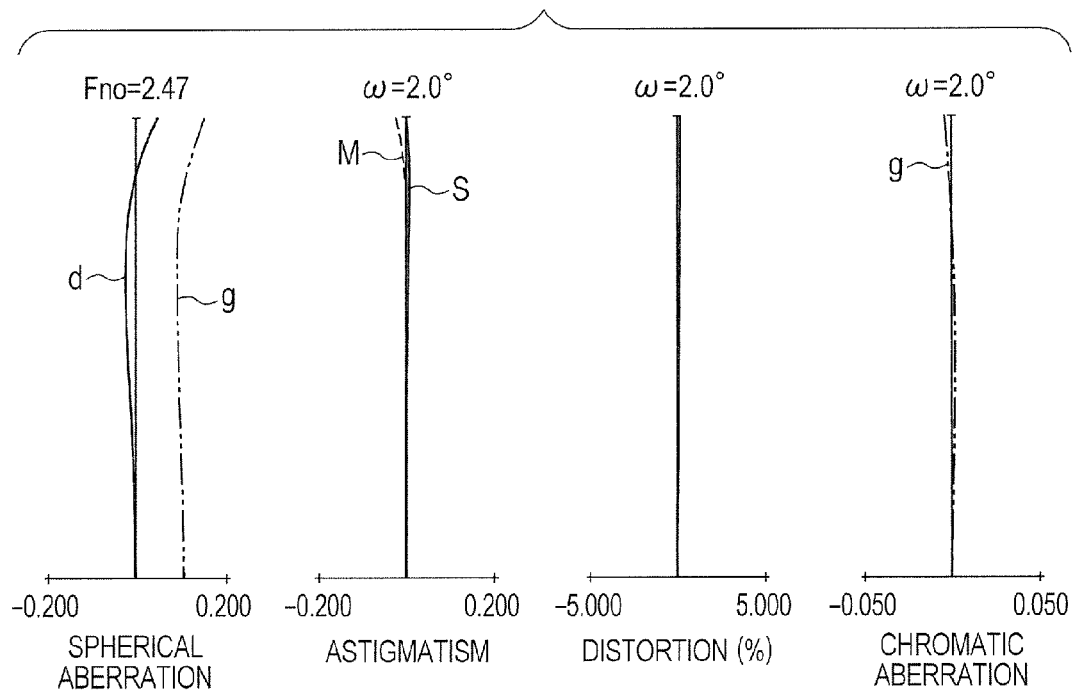
FIG. 16C is an aberration diagram at a telephoto end of the zoom lens of Example 8.

FIG. 15 is a lens cross-sectional view at a wide angle end of a zoom lens according to Example 8 of the present invention. FIGS. 16A, 16B, and 16C are aberration diagrams at the wide angle end, an intermediate zoom position, and a telephoto end, respectively, of the zoom lens of Example 8. The zoom lens of Example 8 has a zoom ratio of 5.00 and an aperture ratio of from 1.85 to 2.47.

Figure 17:
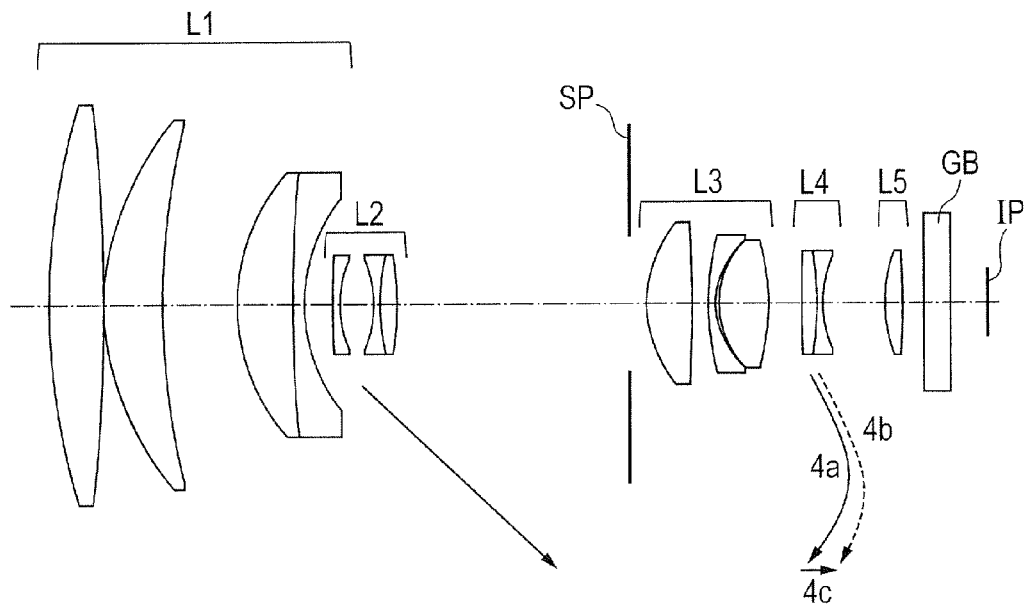
FIG. 17 is a lens cross-sectional view at a wide angle end of a zoom lens according to Example 9 of the present invention.
Figure 18A:
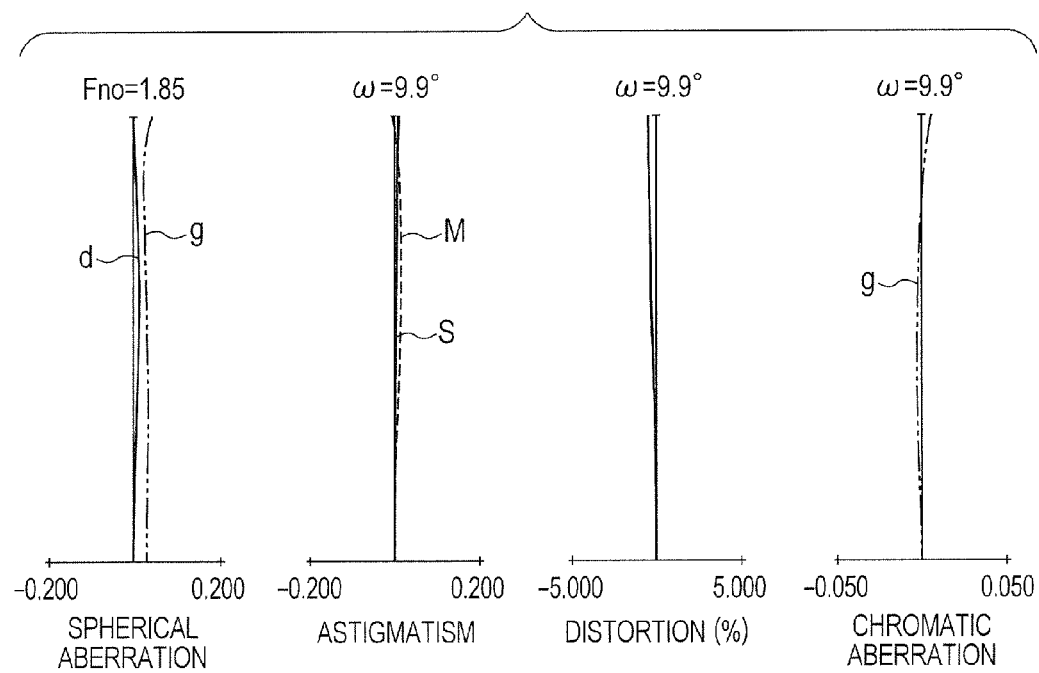
FIG. 18A is an aberration diagram at the wide angle end of the zoom lens of Example 9.
Figure 18B:
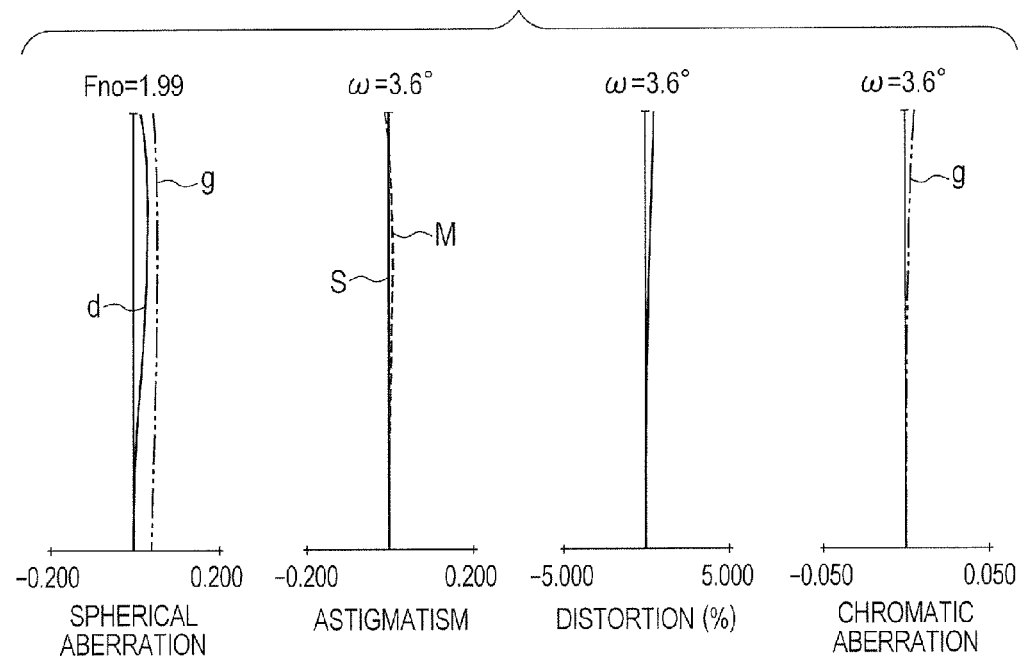
FIG. 18B is an aberration diagram at an intermediate zoom position of the zoom lens of Example 9.
Figure 18C:
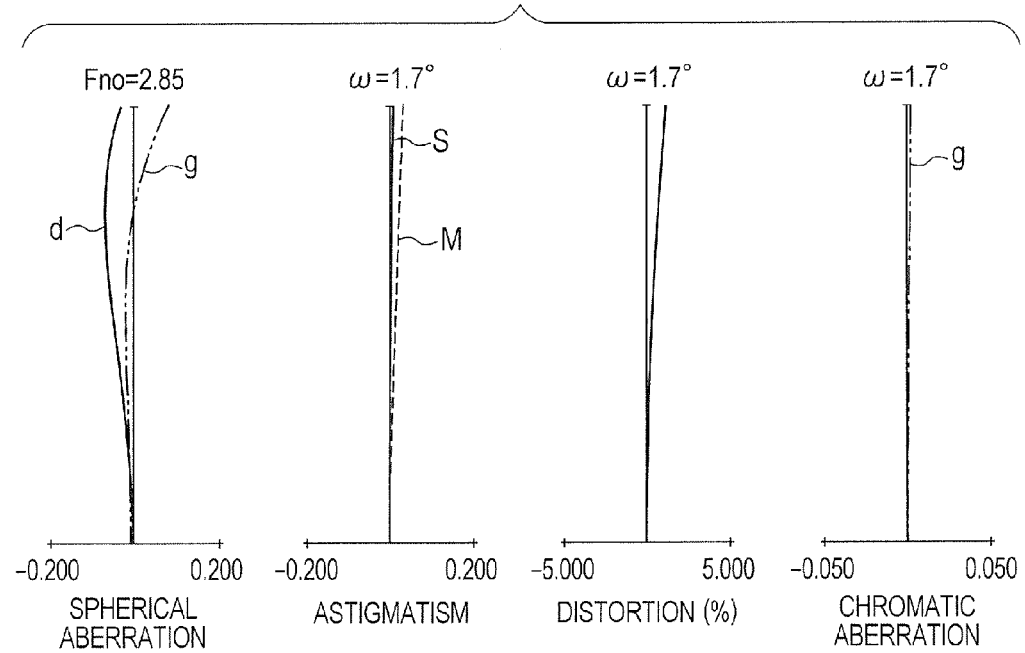
FIG. 18C is an aberration diagram at a telephoto end of the zoom lens of Example 9.
Figure 19:
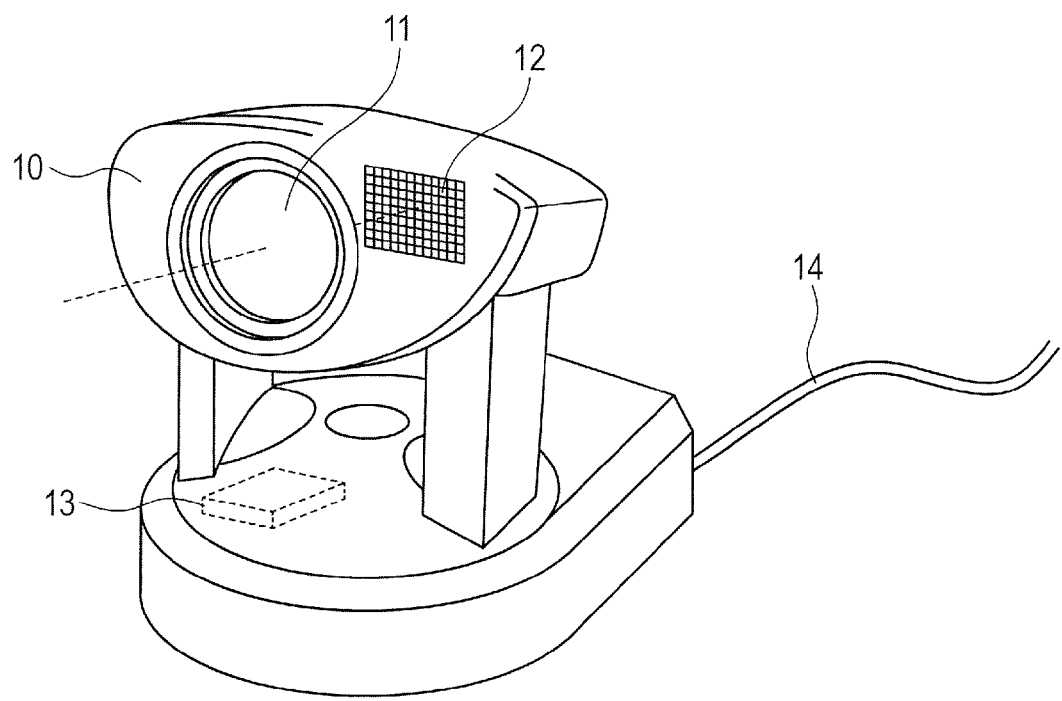
FIG. 19 is a view of an image pickup apparatus (monitoring camera) having the zoom lens of the present invention mounted thereon.

FIG. 17 is a lens cross-sectional view at a wide angle end of a zoom lens according to Example 9 of the present invention. FIGS. 18A, 18B, and 18C are aberration diagrams at the wide angle end, an intermediate zoom position, and a telephoto end, respectively, of the zoom lens of Example 9. The zoom lens of Example 9 has a zoom ratio of 5.76 and an aperture ratio of from 1.85 to 2.85. FIG. 19 is a schematic view of a main part of a monitoring camera (image pickup apparatus) including the zoom lens of the present invention.

The zoom lens according to each of Examples is an image pickup lens system used for an image pickup apparatus such as a monitoring camera, a video camera, a digital still camera, a silver-halide film camera, and a TV camera. Note that, the zoom lens according to each of Examples may also be used as a projection optical system for a projection device (projector). In the lens cross-sectional views, the left side is the object side (front side), and the right side is the image side (rear side). Moreover, in the lens cross-sectional views, when the order of the lens unit from the object side is represented by i, the i-th lens unit is denoted by Li. A rear lens group LR includes at least one lens unit.

The zoom lens further includes an aperture stop SP. An optical block GB corresponds to an optical filter, a face plate, a low pass filter, an infrared cut filter, or the like. An image plane IP corresponds to an image pickup surface of a solid-state image pickup element (photo-electric conversion element) such as a CCD sensor and a CMOS sensor when the zoom lens is used as an image pickup optical system of a video camera or a digital still camera. Alternatively, the image plane IP corresponds to a film surface when the zoom lens is used as an image pickup optical system of a silver-halide film camera.

The arrows indicate movement loci of the respective lens units during zooming (magnification varying) from the wide angle end to the telephoto end, and a movement direction of a lens unit during focusing. In the spherical aberration diagrams, a d-line (wavelength: 587.6 nm) is represented by d, and a g-line (wavelength: 435.8 nm) is represented by g. In the astigmatism diagrams, a sagittal image plane with respect to the d-line is represented by S, and a meridional image plane with respect to the d-line is represented by M. The distortion is depicted for the d-line. In the lateral chromatic aberration diagrams, a g-line is represented by g. In the aberration diagrams, an f-number is represented by Fno, and a half angle of field (degrees) is represented by ω.

Note that, in each of Examples described below, the wide angle end and the telephoto end refer to zoom positions when a magnification-varying lens unit is positioned at one end and the other end of a range in which the magnification-varying lens unit is mechanically movable on an optical axis, respectively.

In each of Examples 1 to 7 and 9, the zoom lens includes a first lens unit L1 having a positive refractive power, a second lens unit L2 having a negative refractive power, and a third lens unit L3 having a positive refractive power. The rear lens group LR consists of a fourth lens unit L4 having a negative refractive power, and a fifth lens unit L5 having a positive refractive power. The aperture stop SP is positioned on the object side of the third lens unit L3. During zooming from the wide angle end to the telephoto end, the second lens unit L2 is configured to move toward the image side. The fourth lens unit L4 is configured to move toward the image side and then toward the object side.

In Examples 1 to 7 and 9, a rear focus type in which the fourth lens unit L4 is moved on the optical axis to perform focusing is adopted. The solid curve 4a and the dotted curve 4b regarding the fourth lens unit L4 are movement loci for correcting an image plane variation accompanying the magnification varying when focused at an object at infinity and an object at proximity, respectively. Moreover, in a case where focusing is performed from the object at infinity to the object at proximity at the telephoto end, the focusing is performed by moving the fourth lens unit L4 toward the image side as indicated by the arrow 4c.

The fourth lens unit L4 is configured to move toward the image side and then toward the object side during zooming to effectively use a space between the fourth lens unit L4 and the fifth lens unit L5 and to effectively reduce a total length of the zoom lens. The aperture stop SP is configured not to move during zooming.

In Example 8, the zoom lens includes a first lens unit L1 having a positive refractive power, a second lens unit L2 having a negative refractive power, and a third lens unit L3 having a positive refractive power. The rear lens group LR consists of a fourth lens unit L4 having a positive refractive power. In Example 8, during zooming from the wide angle end to the telephoto end, the second lens unit L2 is configured to move toward the image side. The fourth lens unit L4 is configured to move toward the object side and then toward the image side. The aperture stop SP is configured to move integrally with (along the same locus as that of) the third lens unit L3 during zooming.

The solid curve 4a and the dotted curve 4b regarding the fourth lens unit L4 are movement loci for correcting the image plane variation accompanying the magnification varying when focused (in focus) at the object at infinity and the object at proximity, respectively. Moreover, in a case where focusing is performed from the object at infinity to the object at proximity at the telephoto end, the focusing is performed by moving the fourth lens unit L4 toward the object side as indicated by the arrow 4c. The fourth lens unit L4 is configured to move along a locus that is convex toward the object side during zooming to effectively use a space between the third lens unit L3 and the fourth lens unit L4 and to effectively reduce the total length of the zoom lens.

Note that, in each of Examples, the first lens unit L1 is configured not to move in an optical axis direction for focusing, but may be moved as necessary for the purpose of correcting the aberrations. Moreover, the whole or a part of the third lens unit L3 may be moved in a direction having a component in a direction perpendicular to the optical axis to correct a blur in a captured image (image blur) when the zoom lens is oscillated during the image capturing.

In the zoom lens in each of Examples, each element is defined so as to downsize an entire system while the zoom lens has a long focal length at the telephoto end and is bright with a large aperture. In general, in order to increase the focal length at the telephoto end while the total length of the zoom lens (value obtained by adding air-equivalent back focus to a distance from the first lens surface to the last lens surface) is in a desired range, it is necessary to move a principal point position of the entire system toward the object side.

Therefore, it is important to appropriately set a lens structure of the first lens unit L1, which is arranged closest to the object side in the entire system, and the refractive power of the second lens unit L2, which is configured to move on the optical axis as a main magnification-varying lens unit during zooming. In general, when the aperture is to be set large and bright at the telephoto end, a diameter of a beam that enters a front lens (first lens unit) of the zoom lens becomes large. In order to obtain high optical characteristics, it is necessary to satisfactorily correct spherical aberration and axial chromatic aberration, in particular, among various aberrations. Therefore, the lens structure of the first lens unit L1 at which the beam diameter is large is an important factor.

Therefore, in each of Examples, the first lens unit L1 consists, in order from the object side to the image side, of a first lens sub-unit L1a having a positive refractive power, and a second lens sub-unit L1b having a negative refractive power over (the boundary of) the widest interval. With this lens structure, a principal point position of the first lens unit L1 having the positive refractive power as a whole is significantly moved toward the object side to reduce the total length of the zoom lens while increasing a focal length of the entire system.

Further, the second lens sub-unit L1b has the negative refractive power to share the negative refractive power with the second lens unit L2 having the negative refractive power, which is configured to serve as the main magnification-varying lens unit, to correct the various aberrations in a balanced manner while increasing the focal length of the entire system at the telephoto end. Moreover, the rear lens group LR is arranged on the image side than the third lens unit L3 to reduce a Petzval sum of the entire system and appropriately set an angle of incidence of a beam on the image plane, with the result that an effective diameter of the front lens is reduced and the entire system is downsized while maintaining good optical characteristics over the entire zoom range.

Moreover, when a focal length of the entire system at the telephoto end is represented by ft, a focal length of the first lens sub-unit L1a is represented by f1a, a lateral magnification of the second lens sub-unit L1b is represented by β1b, and a lateral magnification of the second lens unit L2 at the telephoto end is represented by β2t, in each of Examples, the following conditional expressions are satisfied:

$$0.10 < f1a/ft < 0.60 \quad (1); \text{ and}$$

$$-0.70 < \beta1b/\beta2t < -0.20 \quad (2).$$

Next, technical meanings of the above-mentioned conditional expressions are described. The conditional expression (1) is intended to appropriately set a ratio between the focal length of the first lens sub-unit L1a and the focal length of the entire system at the telephoto end. When the ratio exceeds the upper limit of the conditional expression (1), and hence the power (refractive power) of the first lens sub-unit L1a becomes weak, it becomes difficult to sufficiently extend the principal point position of the entire system toward the object side at the telephoto end. This therefore leads to increases in length and size of the entire system, and hence it is difficult to downsize the entire system. When the ratio falls below the lower limit of the conditional expression (1), and hence the power of the first lens sub-unit L1a becomes strong, large spherical aberration and coma occur at the telephoto end, and hence it is difficult to correct those various aberrations.

The conditional expression (2) is intended to appropriately set a ratio between the lateral magnification of the second lens sub-unit L1b and the lateral magnification of the second lens unit L2 at the telephoto end. When the ratio exceeds the upper limit of the conditional expression (2), the power of the second lens unit L2 becomes strong, and a variation in field curvature and a variation in chromatic aberration are increased during the magnification varying, and hence it is difficult to correct those various aberrations. When the ratio falls below the lower limit of the conditional expression (2), the power of the second lens sub-unit L1b becomes strong, and hence it is difficult to correct the spherical aberration and the coma at the telephoto end. In each of Examples, it is preferred to set the numerical value ranges of the conditional expressions (1) and (2) as follows.

$$0.20 < f1a/ft < 0.57 \quad (1a)$$

$$-0.67 < \beta1b/\beta2t < -0.25 \quad (2a)$$

It is more preferred to set the numerical value ranges of the conditional expressions (1a) and (1b) as follows.

$$0.23 < f1a/ft < 0.55 \quad (1b)$$

$$-0.65 < \beta1b/\beta2t < -0.30 \quad (2b)$$

In each of Examples, the above-mentioned structure is adopted so that the zoom lens having the long focal length at the telephoto end, being bright with the large aperture, and having the high optical characteristics over the entire zoom range while the entire system is small in size is easily obtained. In each of Examples, it is more preferred to satisfy at least one of the following structures.

It is preferred to arrange the aperture stop SP between the second lens unit L2 and the third lens unit L3 or in the third lens unit L3. The aperture stop SP is arranged at the above-mentioned position to appropriately set a distance from the front lens to the aperture stop SP, and hence it is easy to prevent the effective diameter of the front lens from becoming excessively large.

It is preferred that the first lens unit L1, the aperture stop SP, and the third lens unit L3 be configured not to move during zooming. This structure may simplify the structure of an entire apparatus, and hence it is easy to downsize the entire apparatus.

It is preferred that the first lens unit L1 include at least two positive lenses and at least one negative lens, and that the second lens unit L2 include at least one positive lens and at least two negative lenses. Moreover, it is preferred that the third lens unit L3 include at least one positive lens and at least one negative lens. It is more preferred that at least one lens surface of the at least one positive lens included in the third lens unit L3 have an aspherical shape.

When the positive lens(es) and the negative lens(es) are arranged in each of the first lens unit L1 and the second lens unit L2, the chromatic aberration becomes easy to correct in each of the lens units. The axial chromatic aberration and lateral chromatic aberration are satisfactorily corrected in each of the lens units to reduce the variation in chromatic aberration during zooming from the wide angle end to the telephoto end, and hence it is easy to obtain the high optical characteristics over the entire zoom range. Moreover, when the positive lens(es) and the negative lens(es) are arranged in the third lens unit L3, the chromatic aberration becomes easy to correct. Moreover, when the lens surface of the positive lens has the aspherical shape, the spherical aberration and the field curvature become easy to correct at the wide angle end.

Next, in each of Examples, in order to realize the long focal length at the telephoto end and the large and bright aperture, and to obtain even higher optical characteristics over the entire zoom range while the entire system is small in size, it is desired to satisfy at least one of the conditional expressions provided below.

A focal length of the first lens sub-unit L1$a$ is represented by f1$a$, a focal length of the first lens unit L1 is represented by f1, and a focal length of the second lens unit L2 is represented by f2. A focal length of the entire system at the wide angle end is represented by fw. An interval between the first lens sub-unit L1$a$ and the second lens sub-unit L1$b$ is represented by Lab. At this time, it is preferred to satisfy at least one of the following conditional expressions.

$$-10.0 < f1a/f2 < -2.0 \tag{3}$$

$$-20.0 < f1/f2 < -5.0 \tag{4}$$

$$-0.80 < f2/fw < -0.30 \tag{5}$$

$$0.03 < Lab/f1a < 1.00 \tag{6}$$

$$-5.0 < Lab/f2 < -0.1 \tag{7}$$

Next, technical meanings of the above-mentioned conditional expressions are described. The conditional expression (3) is intended to appropriately set a ratio between the focal length of the first lens sub-unit L1$a$ and the focal length of the second lens unit L2. When the ratio exceeds the upper limit of the conditional expression (3), and hence the power of the first lens sub-unit L1$a$ becomes strong, the large spherical aberration and coma occur at the telephoto end, and hence it is difficult to correct those various aberrations. When the ratio falls below the lower limit of the conditional expression (3), and hence the power of the first lens sub-unit L1$a$ becomes weak, it becomes difficult to significantly extend the principal point position of the entire system toward the object side at the telephoto end, with the result that the entire system is increased in length and size, and hence it is difficult to downsize the entire system.

The conditional expression (4) is intended to appropriately set a ratio between the focal length of the first lens unit L1 and the focal length of the second lens unit L2. When the ratio exceeds the upper limit of the conditional expression (4), and hence the power of the first lens unit L1 becomes strong, the large spherical aberration and coma occurs at the telephoto end, and hence it is difficult to correct those various aberrations. When the ratio falls below the lower limit of the conditional expression (4), and hence the power of the second lens unit L2 becomes strong, the variation in field curvature and the variation in chromatic aberration are increased during zooming, and hence it is difficult to correct those various aberrations.

The conditional expression (5) is intended to appropriately set a ratio between the focal length of the entire system at the wide angle end and the focal length of the second lens unit L2. When the ratio exceeds the upper limit of the conditional expression (5), and hence the power of the second lens unit L2 becomes strong, the variation in field curvature and the variation in chromatic aberration are increased during zooming, and hence it is difficult to correct those various aberrations. When the ratio falls below the lower limit of the conditional expression (5), and hence the power of the second lens unit L2 becomes weak, a movement amount of the second lens unit L2 that is required for the magnification varying is increased, and the entire system is disadvantageously increased in length and size.

The conditional expression (6) is intended to appropriately set a ratio between the interval Lab between the first lens sub-unit L1$a$ and the second lens sub-unit L1$b$ and the focal length of the first lens sub-unit L1$a$. When the ratio exceeds the upper limit of the conditional expression (6), and hence the interval Lab becomes long, the entire system is increased in length and size, and it becomes difficult to appropriately set the distance from the front lens to the aperture stop SP. Accordingly, the effective diameter of the front lens is increased, and hence it is difficult to downsize the entire system. When the ratio falls below the lower limit of the conditional expression (6), and hence the first lens sub-unit L1$a$ and the second lens sub-unit L1$b$ are brought close to each other, the principal point position of the first lens unit L1 cannot be extended toward the object side, and it becomes difficult to realize the long focal length at the telephoto end.

The conditional expression (7) is intended to appropriately set a ratio between the interval Lab and the focal length of the second lens unit L2. When the ratio exceeds the upper limit of the conditional expression (7), and hence the first lens sub-unit L1$a$ and the second lens sub-unit L1$b$ are brought close to each other, the principal point position of the first lens unit L1 cannot be extended toward the object side, and it becomes difficult to realize the long focal length at the telephoto end. When the ratio falls below the lower limit of the conditional expression (7), and hence the power of the second lens unit L2 becomes strong, the variation in field curvature and the variation in chromatic aberration are increased during the magnification varying, and hence it is difficult to correct those various aberrations.

Note that, in each of Examples, for the purpose of correcting the aberrations, it is more preferred to set the numerical value ranges of the conditional expressions (3) to (7) as follows.

$$-8.0 < f1a/f2 < -2.5 \tag{3a}$$

$$-15.0 < f1/f2 < -5.5 \tag{4a}$$

$$-0.75 < f2/fw < -0.33 \tag{5a}$$

$$0.05 < Lab/f1a < 0.50 \tag{6a}$$

$$-2.0 < Lab/f2 < -0.3 \tag{7a}$$

It is more preferred to set the numerical value ranges of the conditional expressions (3a) to (7a) as follows.

$$-6.5 < f1a/f2 < -2.8 \tag{3b}$$

$$-10.0 < f1/f2 < -5.9 \tag{4b}$$

$$-0.70 < f2/fw < -0.35 \tag{5b}$$

$$0.07 < Lab/f1a < 0.21 \tag{6b}$$

$$-1.5 < Lab/f2 < -0.4 \tag{7b}$$

Moreover, a zoom lens according to another exemplary embodiment of the present invention includes, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power.

At a telephoto end as compared to a wide angle end, an interval between the first lens unit and the second lens unit is increased, an interval between the second lens unit and the third lens unit is reduced, an interval between the third lens unit and the fourth lens unit is changed, and an interval between the fourth lens unit and the fifth lens unit is changed. In the first lens unit, a first positive lens having a convex surface on the object side is arranged closest to the object side, and a lens arranged closest to the image side in the first lens unit has a concave surface on the image side. During zooming from the wide angle end to the telephoto end, the second lens unit L2 is configured to move toward the image side, and the fourth lens unit L4 is configured to move so as to correct the image plane variation accompanying the zooming.

In each of Examples, a rear focus type in which the fourth lens unit L4 is moved on the optical axis to perform focusing is adopted. The solid curve 4a and the dotted curve 4b regarding the fourth lens unit L4 are movement loci for correcting the image plane variation accompanying the magnification varying when focused at an object at infinity and an object at proximity, respectively. Moreover, in a case where focusing is performed from the object at infinity to the object at proximity at the telephoto end, the focusing is performed by moving the fourth lens unit L4 toward the image side as indicated by the arrow 4c.

The fourth lens unit L4 is configured to move toward the image side and then toward the object side during zooming to effectively use a space between the fourth lens unit L4 and the fifth lens unit L5 and to effectively reduce the total length of the zoom lens. An aperture stop SP is configured not to move during zooming. Note that, in each of Examples, the first lens unit L1 is configured not to move in the optical axis direction for focusing, but may be moved as necessary for the purpose of correcting the aberrations. Moreover, the whole or a part of the third lens unit L3 may be moved in a direction having a component in a direction perpendicular to the optical axis to correct a blur in a captured image (image blur) when the zoom lens is oscillated during the image capturing.

In the zoom lens in each of Examples, each element is defined so as to downsize the entire system while the zoom lens has a long focal length at the telephoto end and is bright with a large aperture.

In general, in order to increase the focal length at the telephoto end while the total length of the zoom lens (value obtained by adding air-equivalent back focus to a distance from the first lens surface to the last lens surface) is in a desired range, it is necessary to move a principal point position of the entire system toward the object side. Therefore, it is important to appropriately set the lens structure of the first lens unit L1, which is arranged closest to the object side in the entire system, and the refractive power of the second lens unit L2, which is configured to move on the optical axis as a main magnification-varying lens unit during zooming.

In general, when the aperture is to be set large and bright at the telephoto end, a diameter of a beam that enters the front lens (first lens unit) of the zoom lens becomes large. In order to obtain the high optical characteristics, it is necessary to satisfactorily correct the spherical aberration and the axial chromatic aberration, in particular, among the various aberrations. Therefore, the lens structure of the first lens unit L1 at which the beam diameter becomes large is an important factor. Therefore, in each of Examples, in the first lens unit L1, a first positive lens having a convex surface on the object side is arranged closest to the object side, and a lens arranged closest to the image side in the first lens unit L1 has a concave surface on the image side.

With the above-mentioned lens structure, the principal point position of the first lens unit L1 having the positive refractive power in total may be significantly extended toward the object side, with the result that the focal length on the telephoto side of the entire system may be increased while reducing the total length of the zoom lens and downsizing the entire system. Moreover, the fifth lens unit L5 is arranged on the image side of the fourth lens unit L4 having the negative refractive power to reduce the angle of incidence of the beam on the periphery of the image plane (the periphery of the screen) while reducing a Petzval sum of the entire system, with the result that the good optical characteristics are maintained over the entire zoom range while downsizing the entire system.

Moreover, a focal length of the first lens unit L1 is represented by f1, a focal length of the second lens unit L2 is represented by f2, and a lateral magnification of the second lens unit L2 at the telephoto end is represented by $\beta 2t$. At this time, the zoom lens in each of Examples satisfies the following conditional expressions:

$$-10.0 < f1/f2 < -4.5 \quad (8); \text{ and}$$

$$-10.0 < \beta 2t < -2.0 \quad (9).$$

Next, technical meanings of the above-mentioned conditional expressions are described. The conditional expression (8) is intended to appropriately set a ratio between the focal length of the first lens unit L1 and the focal length of the second lens unit L2. When the ratio exceeds the upper limit of the conditional expression (8), and hence the power (refractive power) of the first lens unit L1 becomes too strong, large spherical aberration and field curvature occur at the telephoto end, and hence it is difficult to correct those various aberrations. When the ratio falls below the lower limit of the conditional expression (8), and hence the negative power of the second lens unit L2 becomes too strong, the variation in field curvature and the variation in chromatic aberration are increased during the magnification varying, and hence it is difficult to correct those various aberrations.

The conditional expression (9) is intended to appropriately set the lateral magnification of the second lens unit L2 at the telephoto end. When the lateral magnification exceeds the upper limit of the conditional expression (9), the power of the second lens unit L2 becomes weak, and a movement amount of the second lens unit L2 that is required for the magnification varying from the wide angle end to the telephoto end is increased, and the total length of the zoom lens is increased, and hence it is difficult to downsize the entire system. When the lateral magnification falls below the lower limit of the conditional expression (9), the power of the second lens unit L2 becomes strong, and the variation in field curvature and the variation in chromatic aberration are increased during the magnification varying, and hence it is difficult to correct those various aberrations. In each of Examples, it is preferred to set the numerical value ranges of the conditional expressions (8) and (9) as follows.

$$-9.0 < f1/f2 < -5.5 \quad (8a)$$

$$-6.0 < \beta 2t < -2.2 \quad (9a)$$

It is more preferred to set the numerical value ranges of the conditional expressions (8a) and (9a) as follows.

$$-8.5 < f1/f2 < -5.8 \quad (8b)$$

$$-4.5 < 132t < -2.5 \quad (9b)$$

In each of Examples, the above-mentioned structure is adopted so that the zoom lens that is small in size as the entire system, has the long focal length at the telephoto end, is bright with the large aperture, and has the high optical characteristics over the entire zoom range may be obtained. In each of Examples, it is more preferred to satisfy at least one of the following structures. It is preferred that the first lens unit L1, the third lens unit L3, and the fifth lens unit L5 be configured not to move during zooming. With this structure, a structure of the apparatus surrounding an image pickup element may be simplified, and hence it is easy to downsize the entire apparatus.

It is preferred to arrange the aperture stop SP on the image side of the second lens unit L2 and on the object side of a lens surface of the third lens unit L3 closest to the image side. With this arrangement, the distance from the front lens of the zoom lens to the aperture stop SP is appropriately set, and hence it is easy to prevent the effective diameter of the front lens from becoming excessively large. It is preferred that the aperture stop SP be configured not to move during zooming. This structure may simplify the structure of the entire apparatus, and hence it is easy to downsize the entire apparatus.

It is preferred that the first lens unit L1 include at least two positive lenses and at least one negative lens, and that the second lens unit L2 include at least one positive lens and at least two negative lenses. Moreover, it is preferred that the third lens unit L3 include at least one positive lens and at least one negative lens, and that at least one of lens surfaces of the positive lens included in the third lens unit L3 have an aspherical shape. The positive lens and the negative lens are arranged in the lens units of the first lens unit L1 and the second lens unit L2 as described above to facilitate correction of chromatic aberration in the lens units.

Axial chromatic aberration and lateral chromatic aberration are effectively corrected in each of the lens units to suitably reduce the variation in chromatic aberration during the zooming from the wide angle end to the telephoto end, and hence it is easy to obtain the high optical characteristic compatible with the increased number of pixels, which has been strongly desired in recent years. Moreover, the positive lens and the negative lens are arranged as described above in the third lens unit L3 to facilitate correction of the chromatic aberration. Further, the at least one of lens surfaces of the positive lens included in the third lens unit L3 has the aspherical shape to facilitate correction of the spherical aberration and the field curvature at the wide angle end.

During the image-blur correction, it is preferred that the whole or a part of the third lens unit L3 be moved in a direction having the component in the direction perpendicular to the optical axis. With this, it is easy to maintain the good optical characteristics before and after the image-blur correction. Moreover, in order to realize the long focal length at the telephoto end and the large and bright aperture, and to obtain the high optical characteristics over the entire zoom range while the entire system is further downsized, it is desired to satisfy at least one of the following conditional expressions.

$$3.0 < f1/f3 < 10.0 \tag{10}$$

$$-2.0 < f3/f2 < -0.3 \tag{11}$$

$$2.0 < f1/fw < 6.0 \tag{12}$$

$$-0.80 < f2/fw < -0.30 \tag{13}$$

$$0.2 < f3/fw < 2.0 \tag{14}$$

$$-1.00 < \beta 3w < -0.30 \tag{15}$$

$$-1.00 < 133t < -0.10 \tag{16}$$

In the above-mentioned conditional expressions, f3 represents a focal length of the third lens unit L3, fw represents a focal length of the entire system at the wide angle end, β3w represents a lateral magnification of the third lens unit L3 at the wide angle end, and βt represents a lateral magnification of the third lens unit L3 at the telephoto end.

Next, technical meanings of the above-mentioned conditional expressions are described. The conditional expression (10) is intended to appropriately set a ratio between the focal length of the first lens unit L1 and the focal length of the third lens unit L3. When the ratio exceeds the upper limit of the conditional expression (10), and hence the power (refractive power) of the third lens unit L3 becomes too strong, the large spherical aberration and field curvature occur at the wide angle end, and hence it is difficult to correct those various aberrations. When the ratio falls below the lower limit of the conditional expression (10), and hence the power of the first lens unit L1 becomes too strong, large spherical aberration and coma occur at the telephoto end, and hence it is difficult to correct those various aberrations.

The conditional expression (11) is intended to appropriately set a ratio between the focal length of the second lens unit L2 and the focal length of the third lens unit L3. When the ratio exceeds the upper limit of the conditional expression (11), and hence the power of the third lens unit L3 becomes too strong, the large spherical aberration and field curvature occur at the wide angle end, and hence it is difficult to correct those various aberrations. When the ratio falls below the lower limit of the conditional expression (11), and hence the negative power of the second lens unit L2 becomes too strong, the variation in field curvature and the variation in chromatic aberration are increased during the magnification varying, and hence it is difficult to correct those variations in various aberrations.

The conditional expression (12) is intended to appropriately set a ratio between the focal length of the entire system at the wide angle end and the focal length of the first lens unit L1. When the ratio exceeds the upper limit of the conditional expression (12), and hence the focal length of the first lens unit L1 becomes too long, that is, the refractive power becomes too weak, the total length of the zoom lens is increased, and the effective diameter of the front lens is increased, and hence it is difficult to downsize the entire system. When the ratio falls below the lower limit of the conditional expression (12), and hence the power of the first lens unit L1 becomes too strong, large spherical aberration and coma occur at the telephoto end, and hence it is difficult to correct those various aberrations.

The conditional expression (13) is intended to appropriately set a ratio between the focal length of the entire system at the wide angle end and the focal length of the second lens unit L2. When the ratio exceeds the upper limit of the conditional expression (13), and hence the negative power of the second lens unit L2 becomes too strong, the variation in field curvature and the variation in chromatic aberration are increased during the magnification varying, and hence it is difficult to correct those variations in various aberrations. When the ratio falls below the lower limit of the conditional expression (13), and hence the negative power of the second lens unit L2 becomes too weak, the movement amount of the second lens unit L2 is increased during zooming from the wide angle end to the telephoto end, and hence the total length of the zoom lens is increased, and hence it is difficult to downsize the entire system.

The conditional expression (14) is intended to appropriately set a ratio between the focal length of the entire system at the wide angle end and the focal length of the third lens unit L3. When the ratio exceeds the upper limit of the conditional expression (14), and hence the focal length of the third lens unit L3 becomes too long, a distance from the third lens unit L3 to the image plane becomes disadvantageously long, and hence the total length of the zoom lens is increased, and hence it is difficult to downsize the entire system. When the ratio falls below the lower limit of the conditional expression (14), and hence the positive refractive power of the third lens unit L3 becomes too strong, the large spherical aberration and field curvature occur at the wide angle end, and hence it is difficult to correct those various aberrations.

The conditional expression (15) is intended to appropriately set the lateral magnification of the third lens unit L3 at the wide angle end. When the lateral magnification exceeds the upper limit of the conditional expression (15), the positive refractive power of the third lens unit L3 becomes weak, with the result that the distance from the third lens unit L3 to the image plane is disadvantageously increased to increase the total length of the zoom lens, and hence it is difficult to downsize the entire system. When the lateral magnification falls below the lower limit of the conditional expression (15), the positive power of the third lens unit L3 becomes strong, with the result that the large spherical aberration and field curvature occur at the wide angle end, and hence it is difficult to correct those various aberrations.

The conditional expression (16) is intended to appropriately set the lateral magnification of the third lens unit L3 at the telephoto end. When the lateral magnification exceeds the upper limit of the conditional expression (16), the positive power of the third lens unit L3 becomes weak, with the result that the distance from the third lens unit L3 to the image plane is disadvantageously increased to increase the total length of the zoom lens, and hence it is difficult to downsize the entire system. When the lateral magnification falls below the lower limit of the conditional expression (16), the positive power of the third lens unit L3 becomes strong, with the result that the large spherical aberration and field curvature occur at the wide angle end, and hence it is difficult to correct those various aberrations.

Note that, in each of Examples, for the purpose of correcting the aberrations, it is further preferred to set the numerical value ranges of the conditional expressions (10) to (16) as follows.

$$3.2 < f1/f3 < 8.0 \quad (10a)$$

$$-2.0 < f3/f2 < -0.8 \quad (11a)$$

$$2.5 < f1/fw < 5.0 \quad (12a)$$

$$-0.75 < f2/fw < -0.33 \quad (13a)$$

$$0.4 < f3/fw < 1.5 \quad (14a)$$

$$-0.90 < \beta3w < -0.33 \quad (15a)$$

$$-0.70 < \beta3t < -0.20 \quad (16a)$$

It is still further preferred to set the numerical value ranges of the conditional expressions (10a) to (16a) as follows.

$$3.5 < f1/f3 < 6.0 \quad (10b)$$

$$-2.0 < f3/f2 < -1.0 \quad (11b)$$

$$2.8 < f1/fw < 4.5 \quad (12b)$$

$$-0.70 < f2/fw < -0.35 \quad (13b)$$

$$0.6 < f3/fw < 1.2 \quad (14b)$$

$$-0.80 < \beta3w < -0.35 \quad (15b)$$

$$-0.65 < \beta3t < -0.25 \quad (16b)$$

In each of Examples, each of the lens units is configured as described above to realize the long focal length at the telephoto end and the large and bright aperture, and obtain the high optical characteristics over the entire zoom range while the entire system is small in size.

Next, lens structures of the respective lens units in each of Examples are described. In the zoom lens in Example 1, the first lens sub-unit L1a consists of two positive lenses, and the second lens sub-unit L1b consists of a cemented lens formed by cementing a positive lens and a negative lens. The second lens unit L2 includes, in order from the object side to the image side, a negative lens, and a cemented lens formed by cementing a negative lens and a positive lens. The third lens unit L3 includes, in order from the object side to the image side, a positive lens, and a cemented lens formed by cementing a negative lens and a positive lens.

The fourth lens unit L4 includes a cemented lens formed by cementing a positive lens and a negative lens in order from the object side to the image side. The fifth lens unit L5 consists of a single positive lens.

As compared to Example 1, the zoom lens in Example 2 is the same in terms of the lens structures of the first lens sub-unit L1a, the second lens sub-unit L1b, the third lens unit L3, and the fifth lens unit L5. The second lens unit L2 includes, in order from the object side to the image side, a negative lens, a negative lens, and a positive lens. The fourth lens unit L4 consists of a single negative lens.

As compared to Example 1, the zoom lens in Example 3 is the same in terms of the lens structures of the third lens unit L3 and the fifth lens unit L5. The first lens sub-unit L1a consists of three positive lenses, and the second lens sub-unit L1b consists of a single negative lens. The second lens unit L2 includes, in order from the object side to the image side, a negative lens, a negative lens, and a positive lens. The fourth lens unit L4 consists of a single negative lens.

As compared to Example 1, the zoom lens in Example 4 is the same in terms of the lens structures of the first lens sub-unit L1a, the second lens sub-unit L1b, the second lens unit L2, the fourth lens unit L4, and the fifth lens unit L5. The third lens unit L3 includes, in order from the object side to the image side, a positive lens, a cemented lens formed by cementing a positive lens and a negative lens, and a positive lens.

As compared to Example 1, the zoom lens in Example 5 is the same in terms of the lens structures of the first lens sub-unit L1a, the second lens sub-unit L1b, the second lens unit L2, the fourth lens unit L4, and the fifth lens unit L5. The third lens unit L3 includes, in order from the object side to the image side, a positive lens, a cemented lens formed by cementing a negative lens and a positive lens, and a positive lens.

As compared to Example 1, the zoom lens in Example 6 is the same in terms of the lens structures of the second lens sub-unit L1b, the second lens unit L2, the fourth lens unit L4, and the fifth lens unit L5. The first lens sub-unit L1a consists of three positive lenses. The third lens unit L3 includes, in order from the object side to the image side, a positive lens, a cemented lens formed by cementing a negative lens and a positive lens, and a positive lens.

As compared to Example 1, the zoom lens in Example 7 is the same in terms of the lens structures of the first lens sub-unit L1a, the second lens sub-unit L1b, the second lens unit L2, the fourth lens unit L4, and the fifth lens unit L5. The third lens unit L3 includes, in order from the object side to the image side, a positive lens, a cemented lens formed by cementing a positive lens and a negative lens, and a positive lens.

The zoom lens in Example 8 is a four-unit zoom lens, and is different from the five-unit zoom lens in each of Examples 1 to 7 in terms of zoom type. As compared to Example 1, the zoom lens in Example 8 is the same in terms of the lens structures of the first lens sub-unit L1a, the second lens sub-unit L1b, and the second lens unit L2. The third lens unit L3 includes, in order from the object side to the image side, a positive lens, a negative lens, and a positive lens. The fourth lens unit L4 consists of a single positive lens.

As compared to Example 1, the zoom lens in Example 9 is the same in terms of the lens structures of the first lens sub-unit L1a, the second lens sub-unit L1b, the second lens unit L2, the fourth lens unit L4, and the fifth lens unit L5. The third lens unit L3 includes, in order from the object side to the image side, a positive lens, a negative lens, and a positive lens.

Next, an example of an image pickup apparatus (monitoring camera) using the zoom lens according to the present invention is described with reference to FIG. 19. In FIG. 19, a monitoring camera main body 10, and an image pickup optical system 11 formed of the zoom lens described in any one of Examples 1 to 9 are illustrated. A solid-state image pickup element (photo-electric conversion element) 12 such as a CCD sensor or a CMOS sensor is included in the camera main body, and is configured to receive light of a subject image formed by the image pickup optical system 11. A memory (recording unit) 13 is configured to record information corresponding to the subject image that has been photo-electrically converted by the solid-state image pickup element 12. A network cable is configured to transfer the subject image that has been photo-electrically converted by the solid-state image pickup element 12.

By applying the zoom lens of the present invention to the image pickup apparatus such as a monitoring camera in such a manner, the compact image pickup apparatus having the high optical characteristics may be realized. Note that, if an electronic image pickup element such as a CCD is used as the image pickup element, the aberration is electronically corrected, to thereby enable the image quality of an output image to be more enhanced.

Although the exemplary embodiments of the present invention have been described so far, the present invention is by no means limited to those embodiments, and hence various changes and modifications can be made within the scope of the subject matter of the present invention.

Now, specific numerical data of Numerical Examples 1 to 9 are described, which correspond to Examples 1 to 9, respectively. In each of Numerical Examples, symbol i represents the number of a surface counted from the object side. Symbol ri represents a curvature radius of an i-th optical surface (i-th surface). Symbol di represents a gap between an i-th surface and an (i+1)th surface on the optical axis. Symbols ndi and vdi represent a refractive index and an Abbe number of a material of an optical member between the i-th surface and the (i+1)th surface with respect to the d-line, respectively. Two surfaces closest to the image side correspond to the optical block GB. An aspherical shape is expressed by the expression below.

$$X = \frac{H^2/R}{1 + \left(\sqrt{1-(1+K)(H/R)^2}\right)} + A4H^4 + A6H^6 + A8H^8$$

where the X axis corresponds to the optical axis direction, the H axis corresponds to the direction perpendicular to the optical axis, the light propagation direction is positive, symbol R represents a paraxial curvature radius, symbol K represents a conic constant, and symbols A4, A6, and A8 represent aspherical surface coefficients, respectively.

Symbol "*" means a surface having an aspherical shape, and [e-x] means $10^{-x}$. Symbol BF is back focus, which represents an air-equivalent distance from a final lens surface.

[Numerical Example 1]

| Unit mm | | | | |
|---|---|---|---|---|
| Surface data | | | | |
| Surface number | r | d | nd | vd |
| 1 | 64.161 | 4.70 | 1.48749 | 70.2 |
| 2 | −182.207 | 0.15 | | |
| 3 | 26.543 | 4.90 | 1.49700 | 81.5 |
| 4 | 69.879 | 8.69 | | |
| 5 | 17.054 | 5.00 | 1.48749 | 70.2 |
| 6 | 114.666 | 1.00 | 1.80610 | 33.3 |
| 7 | 14.915 | (Variable) | | |
| 8 | 51.297 | 0.60 | 1.83481 | 42.7 |
| 9 | 9.031 | 4.60 | | |
| 10 | −12.251 | 0.50 | 1.48749 | 70.2 |
| 11 | 14.567 | 1.30 | 1.85478 | 24.8 |
| 12 | 389.773 | (Variable) | | |
| 13 (Stop) | ∞ | 1.50 | | |
| 14* | 13.353 | 3.50 | 1.69350 | 53.2 |
| 15* | −25.580 | 1.76 | | |
| 16 | 109.640 | 0.60 | 1.85478 | 24.8 |
| 17 | 7.900 | 4.50 | 1.69680 | 55.5 |
| 18 | −19.963 | (Variable) | | |
| 19 | 164.928 | 2.20 | 1.94595 | 18.0 |
| 20 | −9.878 | 0.50 | 1.91082 | 35.3 |
| 21 | 8.406 | (Variable) | | |
| 22 | 12.810 | 2.60 | 1.48749 | 70.2 |
| 23 | −16.683 | 2.00 | | |
| 24 | ∞ | 2.34 | 1.51633 | 64.1 |
| 25 | ∞ | 3.29 | | |
| Image plane | ∞ | | | |

| Aspherical surface data |
|---|
| Fourteenth surface |

K = −3.36653e−001    A4 = −4.89021e−005    A6 = 5.99943e−007
A8 = −2.26933e−009    A10 = 2.62646e−011
Fifteenth surface K = 0.00000e+000    A4 = 1.25621e−004    A6 = 1.19175e−007

| Various data | | | |
|---|---|---|---|
| Zoom ratio 4.81 | | | |
| | Wide angle | Intermediate | Telephoto |
| Focal length | 17.86 | 45.54 | 85.85 |
| F-number | 1.85 | 2.03 | 2.47 |
| Half angle of field (degrees) | 9.54 | 3.77 | 2.00 |
| Image height | 3.00 | 3.00 | 3.00 |
| Total lens length | 82.90 | 82.90 | 82.90 |
| BF | 6.84 | 6.84 | 6.84 |
| d7 | 2.54 | 13.84 | 19.67 |
| d12 | 18.63 | 7.33 | 1.51 |
| d18 | 2.28 | 3.25 | 1.47 |
| d21 | 4.01 | 3.04 | 4.82 |

[Numerical Example 2]

Unit mm

Surface data

| Surface number | r | d | nd | vd |
|---|---|---|---|---|
| 1 | 46.569 | 5.20 | 1.48749 | 70.2 |
| 2 | −1,625.085 | 0.15 | | |
| 3 | 30.944 | 4.80 | 1.49700 | 81.5 |
| 4 | 93.502 | 9.97 | | |
| 5 | 18.656 | 5.00 | 1.48749 | 70.2 |
| 6 | 289.077 | 1.00 | 1.80610 | 33.3 |
| 7 | 16.267 | (Variable) | | |
| 8 | 23.763 | 0.60 | 1.83481 | 42.7 |
| 9 | 8.833 | 1.79 | | |
| 10 | −12.208 | 0.50 | 1.69680 | 55.5 |
| 11 | 28.817 | 1.58 | | |
| 12 | 28.802 | 1.30 | 1.85478 | 24.8 |
| 13 | −54.459 | (Variable) | | |
| 14 (Stop) | ∞ | 1.50 | | |
| 15* | 12.471 | 3.60 | 1.69350 | 53.2 |
| 16* | −27.368 | 2.45 | | |
| 17 | 74.065 | 0.60 | 1.85478 | 24.8 |
| 18 | 9.026 | 3.60 | 1.48749 | 70.2 |
| 19 | −18.383 | (Variable) | | |
| 20 | −64.502 | 0.55 | 1.63854 | 55.4 |
| 21 | 10.376 | (Variable) | | |
| 22 | 21.255 | 1.80 | 2.00100 | 29.1 |
| 23 | −35.167 | 2.00 | | |
| 24 | ∞ | 2.34 | 1.51633 | 64.1 |
| 25 | ∞ | 3.31 | | |
| Image plane | ∞ | | | |

Aspherical surface data

Fifteenth surface

K = −6.23510e−001    A4 = −3.47317e−005
A6 = 2.53574e−007    A8 = 1.50103e−009

Sixteenth surface

K = 0.00000e+000    A4 = 9.05548e−005

Various data
Zoom ratio 4.80

| | Wide angle | Intermediate | Telephoto |
|---|---|---|---|
| Focal length | 17.89 | 46.22 | 85.85 |
| F-number | 1.85 | 2.10 | 2.47 |
| Half angle of field (degrees) | 9.52 | 3.71 | 2.00 |
| Image height | 3.00 | 3.00 | 3.00 |
| Total lens length | 84.20 | 84.20 | 84.20 |
| BF | 6.85 | 6.85 | 6.85 |
| d7 | 2.11 | 14.67 | 21.14 |
| d13 | 20.49 | 7.94 | 1.47 |
| d19 | 4.13 | 5.18 | 1.68 |
| d21 | 4.62 | 3.57 | 7.07 |

[Numerical Example 3]

Unit mm

Surface data

| Surface number | r | d | nd | vd |
|---|---|---|---|---|
| 1 | 85.672 | 3.60 | 1.48749 | 70.2 |
| 2 | −220.569 | 0.15 | | |
| 3 | 40.056 | 4.20 | 1.49700 | 81.5 |
| 4 | 178.292 | 0.15 | | |
| 5 | 24.838 | 4.50 | 1.49700 | 81.5 |
| 6 | 59.639 | 9.32 | | |
| 7 | 62.096 | 1.00 | 1.85478 | 24.8 |
| 8 | 20.292 | (Variable) | | |
| 9 | 192.113 | 0.50 | 1.91082 | 35.3 |
| 10 | 10.909 | 2.20 | | |
| 11 | −12.423 | 0.50 | 1.77250 | 49.6 |
| 12 | −87.810 | 1.51 | | |
| 13 | 70.846 | 1.20 | 1.95906 | 17.5 |
| 14 | −42.199 | (Variable) | | |
| 15 (Stop) | ∞ | 1.50 | | |
| 16* | 12.245 | 3.50 | 1.69350 | 53.2 |
| 17* | −63.237 | 2.63 | | |
| 18 | 18.596 | 0.60 | 1.85478 | 24.8 |
| 19 | 6.947 | 3.70 | 1.48749 | 70.2 |
| 20 | −150.996 | (Variable) | | |
| 21 | −85.804 | 0.50 | 1.48749 | 70.2 |
| 22 | 14.160 | (Variable) | | |
| 23 | 15.445 | 2.00 | 2.00100 | 29.1 |
| 24 | 259.601 | 2.00 | | |
| 25 | ∞ | 2.34 | 1.51633 | 64.1 |
| 26 | ∞ | 2.81 | | |
| Image plane | ∞ | | | |

Aspherical surface data

Sixteenth surface

K = 6.36561e−002    A4 = −4.58066e−005
A6 = −6.41225e−008    A8 = −1.02282e−009

Seventeenth surface

K = 0.00000e+000    A4 = 4.78853e−005

Various data
Zoom ratio 4.81

| | Wide angle | Intermediate | Telephoto |
|---|---|---|---|
| Focal length | 17.84 | 45.88 | 85.85 |
| F-number | 1.85 | 2.09 | 2.47 |
| Half angle of field (degrees) | 9.55 | 3.74 | 2.00 |
| Image height | 3.00 | 3.00 | 3.00 |
| Total lens length | 83.37 | 83.37 | 83.37 |
| BF | 6.35 | 6.35 | 6.35 |
| d8 | 2.39 | 14.89 | 21.32 |
| d14 | 20.41 | 7.91 | 1.48 |
| d20 | 4.80 | 7.41 | 1.57 |
| d22 | 6.15 | 3.54 | 9.39 |

[Numerical Example 4]

Unit mm

Surface data

| Surface number | r | d | nd | vd |
|---|---|---|---|---|
| 1 | 55.220 | 5.14 | 1.48749 | 70.2 |
| 2 | −146.853 | 0.15 | | |
| 3 | 27.350 | 5.05 | 1.49700 | 81.5 |
| 4 | 92.976 | 3.27 | | |
| 5 | 36.906 | 3.42 | 1.48749 | 70.2 |
| 6 | 704.212 | 1.20 | 2.00069 | 25.5 |
| 7 | 48.594 | (Variable) | | |
| 8 | 42.924 | 0.70 | 1.91082 | 35.3 |
| 9 | 9.395 | 4.31 | | |

-continued

Unit mm

| | | | | |
|---|---|---|---|---|
| 10 | −10.577 | 0.70 | 1.69680 | 55.5 |
| 11 | 15.311 | 1.49 | 1.95906 | 17.5 |
| 12 | 935.148 | (Variable) | | |
| 13 (Stop) | ∞ | 1.50 | | |
| 14* | 11.810 | 3.76 | 1.69350 | 53.2 |
| 15* | −41.581 | 1.15 | | |
| 16 | 10.900 | 2.78 | 1.48749 | 70.2 |
| 17 | 312.999 | 0.80 | 2.00069 | 25.5 |
| 18 | 8.584 | 0.72 | | |
| 19 | 14.327 | 2.20 | 1.65160 | 58.5 |
| 20 | −30.277 | (Variable) | | |
| 21 | 24.627 | 1.45 | 1.94595 | 18.0 |
| 22 | −43.875 | 0.60 | 2.00100 | 29.1 |
| 23 | 9.814 | (Variable) | | |
| 24 | 9.524 | 2.10 | 1.77250 | 49.6 |
| 25 | 45.611 | 2.30 | | |
| 26 | ∞ | 2.34 | 1.51633 | 64.1 |
| 27 | ∞ | 3.23 | | |
| Image plane | ∞ | | | |

Aspherical surface data

Fourteenth surface

K = −1.13361e+000    A4 = 2.98325e−005
A6 = 2.10785e−007    A8 = 1.95005e−009

Fifteenth surface

K = 0.00000e+000    A4 = 7.27073e−005

Various data
Zoom ratio 7.95

| | Wide angle | Intermediate | Telephoto |
|---|---|---|---|
| Focal length | 10.86 | 50.59 | 86.29 |
| F-number | 1.85 | 2.16 | 2.47 |
| Half angle of field (degrees) | 15.44 | 3.39 | 1.99 |
| Image height | 3.00 | 3.00 | 3.00 |
| Total lens length | 79.19 | 79.19 | 79.19 |
| BF | 7.07 | 7.07 | 7.07 |
| d7 | 2.00 | 16.13 | 19.67 |
| d12 | 19.17 | 5.03 | 1.50 |
| d20 | 0.97 | 6.59 | 0.99 |
| d23 | 7.49 | 1.87 | 7.46 |

[Numerical Example 5]

Unit mm

Surface data

| Surface number | r | d | nd | vd |
|---|---|---|---|---|
| 1 | 39.003 | 5.25 | 1.49700 | 81.5 |
| 2 | 2,003.993 | 0.15 | | |
| 3 | 29.600 | 5.06 | 1.49700 | 81.5 |
| 4 | 133.970 | 7.32 | | |
| 5 | 26.212 | 4.32 | 1.48749 | 70.2 |
| 6 | −145.479 | 1.00 | 1.90366 | 31.3 |
| 7 | 29.218 | (Variable) | | |
| 8 | 25.860 | 0.60 | 2.00100 | 29.1 |
| 9 | 7.797 | 3.39 | | |
| 10 | −8.273 | 0.50 | 1.69680 | 55.5 |
| 11 | 14.965 | 1.17 | 1.95906 | 17.5 |
| 12 | −74.060 | (Variable) | | |

-continued

Unit mm

| | | | | |
|---|---|---|---|---|
| 13 (Stop) | ∞ | 1.50 | | |
| 14* | 11.195 | 5.08 | 1.58313 | 59.4 |
| 15* | −26.126 | 1.26 | | |
| 16 | 18.549 | 0.60 | 2.00069 | 25.5 |
| 17 | 8.162 | 4.20 | 1.48749 | 70.2 |
| 18 | 105.025 | 0.14 | | |
| 19 | 29.533 | 2.19 | 1.48749 | 70.2 |
| 20 | −22.733 | (Variable) | | |
| 21 | 97.689 | 1.60 | 1.95906 | 17.5 |
| 22 | −13.404 | 0.50 | 2.00100 | 29.1 |
| 23 | 11.210 | (Variable) | | |
| 24 | 10.880 | 1.69 | 1.60342 | 38.0 |
| 25 | 304.611 | 2.02 | | |
| 26 | ∞ | 2.34 | 1.51633 | 64.1 |
| 27 | ∞ | 3.31 | | |
| Image plane | ∞ | | | |

Aspherical surface data

Fourteenth surface

K = −3.23085e−001    A4 = −7.60166e−005
A6 = 2.46678e−007    A8 = −4.90244e−010

Fifteenth surface

K = −9.56626e−001    A4 = 9.23051e−005

Various data
Zoom ratio 7.69

| | Wide angle | Intermediate | Telephoto |
|---|---|---|---|
| Focal length | 17.66 | 53.84 | 135.81 |
| F-number | 1.85 | 2.85 | 3.91 |
| Half angle of field (degrees) | 9.64 | 3.19 | 1.27 |
| Image height | 3.00 | 3.00 | 3.00 |
| Total lens length | 82.90 | 82.90 | 82.90 |
| BF | 6.87 | 6.87 | 6.87 |
| d7 | 3.91 | 13.52 | 18.47 |
| d12 | 16.03 | 6.42 | 1.47 |
| d20 | 3.79 | 7.18 | 0.98 |
| d23 | 4.76 | 1.38 | 7.57 |

[Numerical Example 6]

Unit mm

Surface data

| Surface number | r | d | nd | vd |
|---|---|---|---|---|
| 1 | 251.230 | 2.30 | 1.48749 | 70.2 |
| 2 | −174.561 | 0.15 | | |
| 3 | 27.272 | 5.98 | 1.49700 | 81.5 |
| 4 | 112.640 | 0.15 | | |
| 5 | 25.695 | 4.52 | 1.49700 | 81.5 |
| 6 | 71.700 | 4.44 | | |
| 7 | 19.249 | 4.72 | 1.48749 | 70.2 |
| 8 | −376.639 | 1.00 | 1.91082 | 35.3 |
| 9 | 14.245 | (Variable) | | |
| 10 | 28.804 | 0.60 | 2.00100 | 29.1 |
| 11 | 9.048 | 3.29 | | |
| 12 | −9.356 | 0.50 | 1.69680 | 55.5 |
| 13 | 16.344 | 1.19 | 1.95906 | 17.5 |
| 14 | −96.366 | (Variable) | | |
| 15 (Stop) | ∞ | 1.50 | | |
| 16* | 11.416 | 4.61 | 1.58313 | 59.4 |
| 17* | −28.700 | 1.12 | | |
| 18 | 18.972 | 0.60 | 2.00069 | 25.5 |
| 19 | 8.356 | 3.68 | 1.48749 | 70.2 |
| 20 | 74.522 | 0.69 | | |
| 21 | 33.681 | 2.20 | 1.48749 | 70.2 |
| 22 | −23.227 | (Variable) | | |
| 23 | 49.591 | 1.71 | 1.95906 | 17.5 |
| 24 | −15.398 | 0.50 | 2.00100 | 29.1 |

-continued

| Unit mm | | | | |
|---|---|---|---|---|
| 25 | 11.205 | (Variable) | | |
| 26 | 12.011 | 1.76 | 1.60342 | 38.0 |
| 27 | −169.396 | 2.00 | | |
| 28 | ∞ | 2.34 | 1.51633 | 64.1 |
| 29 | ∞ | 3.30 | | |
| Image plane | ∞ | | | |

Aspherical surface data

Sixteenth surface

K = −4.19849e−001    A4 = −5.61616e−005
A6 = 2.28336e−007    A8 = 7.25490e−011

Seventeenth surface

K = −3.98168e+000    A4 = 6.97491e−005

Various data
Zoom ratio 7.69

| | Wide angle | Intermediate | Telephoto |
|---|---|---|---|
| Focal length | 17.66 | 54.67 | 135.81 |
| F-number | 1.85 | 2.83 | 3.91 |
| Half angle of field (degrees) | 9.64 | 3.14 | 1.27 |
| Image height | 3.00 | 3.00 | 3.00 |
| Total lens length | 82.90 | 82.90 | 82.90 |
| BF | 6.84 | 6.84 | 6.84 |
| d9 | 1.40 | 12.83 | 18.72 |
| d14 | 18.80 | 7.37 | 1.49 |
| d22 | 3.28 | 7.03 | 1.00 |
| d25 | 5.37 | 1.62 | 7.65 |

[Numerical Example 7]

| Unit mm | | | | |
|---|---|---|---|---|
| Surface data | | | | |
| Surface number | r | d | nd | νd |
| 1 | 45.621 | 5.50 | 1.48749 | 70.2 |
| 2 | −262.608 | 0.15 | | |
| 3 | 26.993 | 5.00 | 1.49700 | 81.5 |
| 4 | 73.966 | 10.15 | | |
| 5 | 25.972 | 4.00 | 1.48749 | 70.2 |
| 6 | −237.764 | 1.20 | 1.85478 | 24.8 |
| 7 | 27.643 | (Variable) | | |
| 8 | 54.786 | 0.70 | 2.00100 | 29.1 |
| 9 | 9.218 | 3.05 | | |
| 10 | −9.185 | 0.70 | 1.77250 | 49.6 |
| 11 | 18.217 | 1.60 | 1.95906 | 17.5 |
| 12 | −37.555 | (Variable) | | |
| 13 (Stop) | ∞ | 1.50 | | |
| 14* | 12.404 | 3.40 | 1.69350 | 53.2 |
| 15* | −33.298 | 0.15 | | |
| 16 | 10.310 | 2.80 | 1.48749 | 70.2 |
| 17 | 149.183 | 0.80 | 2.00069 | 25.5 |
| 18 | 8.616 | 1.65 | | |
| 19 | 15.457 | 2.40 | 1.65160 | 58.5 |
| 20 | −29.305 | (Variable) | | |
| 21 | 45.802 | 2.40 | 1.85478 | 24.8 |
| 22 | −10.686 | 0.60 | 1.91082 | 35.3 |
| 23 | 12.831 | (Variable) | | |
| 24 | 11.784 | 2.00 | 1.80400 | 46.6 |
| 25 | 491.900 | 2.02 | | |
| 26 | ∞ | 2.34 | 1.51633 | 64.1 |
| 27 | ∞ | 3.28 | | |
| Image plane | ∞ | | | |

Aspherical surface data

Fourteenth surface

K = 6.48237e−002    A4 = −4.87956e−005
A6 = 4.98814e−008    A8 = −1.98583e−010

Fifteenth surface

K = 0.00000e+000    A4 = 8.28321e−005

Various data
Zoom ratio 4.95

| | Wide angle | Intermediate | Telephoto |
|---|---|---|---|
| Focal length | 17.44 | 58.10 | 86.29 |
| F-number | 1.85 | 2.22 | 2.47 |
| Half angle of field (degrees) | 9.76 | 2.96 | 1.99 |
| Image height | 3.00 | 3.00 | 3.00 |
| Total lens length | 79.21 | 79.21 | 79.21 |
| BF | 6.84 | 6.84 | 6.84 |
| d7 | 2.19 | 11.77 | 14.16 |
| d12 | 13.45 | 3.87 | 1.48 |
| d20 | 2.74 | 5.48 | 0.99 |
| d23 | 4.23 | 1.50 | 5.99 |

[Numerical Example 8]

| Unit mm | | | | |
|---|---|---|---|---|
| Surface data | | | | |
| Surface number | r | d | nd | νd |
| 1 | 60.785 | 4.35 | 1.48749 | 70.2 |
| 2 | −233.420 | 0.15 | | |
| 3 | 26.269 | 6.28 | 1.49700 | 81.5 |
| 4 | 166.295 | 6.34 | | |
| 5 | 27.129 | 5.83 | 1.48749 | 70.2 |
| 6 | −128.561 | 1.20 | 1.90366 | 31.3 |
| 7 | 24.540 | (Variable) | | |
| 8 | 32.816 | 0.70 | 2.00100 | 29.1 |
| 9 | 9.886 | 2.71 | | |
| 10 | −9.293 | 0.70 | 1.69680 | 55.5 |
| 11 | 22.115 | 1.43 | 1.95906 | 17.5 |
| 12 | −53.299 | (Variable) | | |
| 13* | 9.359 | 3.90 | 1.69350 | 53.2 |
| 14* | −36.781 | 1.18 | | |
| 15 (Stop) | ∞ | 2.20 | | |
| 16 | −16.465 | 0.60 | 1.85478 | 24.8 |
| 17 | 9.121 | 0.34 | | |
| 18 | 12.877 | 2.67 | 1.48749 | 70.2 |
| 19 | −14.437 | (Variable) | | |
| 20 | 16.996 | 2.04 | 1.91082 | 35.3 |
| 21 | −105.990 | (Variable) | | |
| 22 | ∞ | 2.34 | 1.51633 | 64.1 |
| 23 | ∞ | 4.00 | | |
| Image plane | ∞ | | | |

Aspherical surface data

Thirteenth surface

K = −5.72217e−001    A4 = 5.33522e−005
A6 = 2.24784e−007    A8 = −1.30744e−008

Fourteenth surface

K = 0.00000e+000    A4 = 1.34763e−004    A6 = −1.93585e−006

Various data
Zoom ratio 5.00

| | Wide angle | Intermediate | Telephoto |
|---|---|---|---|
| Focal length | 17.26 | 48.58 | 86.34 |
| F-number | 1.85 | 2.03 | 2.47 |
| Half angle of field (degrees) | 9.86 | 3.53 | 1.99 |

-continued

| Unit mm | | | |
|---|---|---|---|
| Image height | 3.00 | 3.00 | 3.00 |
| Total lens length | 79.30 | 79.30 | 79.30 |
| BF | 12.55 | 14.90 | 11.19 |
| d7 | 2.14 | 12.28 | 16.63 |
| d12 | 15.45 | 5.31 | 0.96 |
| d19 | 6.54 | 4.18 | 7.89 |
| d21 | 7.00 | 9.36 | 5.65 |

[Numerical Example 9]

| Unit mm | | | | |
|---|---|---|---|---|
| Surface data | | | | |
| Surface number | r | d | nd | vd |
| 1 | 62.266 | 4.87 | 1.48749 | 70.2 |
| 2 | −158.537 | 0.15 | | |
| 3 | 25.379 | 5.14 | 1.49700 | 81.5 |
| 4 | 69.178 | 6.67 | | |
| 5 | 18.105 | 4.92 | 1.49700 | 81.5 |
| 6 | 134.757 | 1.00 | 1.83400 | 37.2 |
| 7 | 15.451 | (Variable) | | |
| 8 | 63.958 | 0.60 | 1.91082 | 35.3 |
| 9 | 10.018 | 3.14 | | |
| 10 | −10.137 | 0.50 | 1.60311 | 60.6 |
| 11 | 17.195 | 1.53 | 1.85478 | 24.8 |
| 12 | −36.505 | (Variable) | | |

-continued

| Unit mm | | | | |
|---|---|---|---|---|
| 13 (Stop) | ∞ | 1.50 | | |
| 14* | 11.002 | 4.11 | 1.69350 | 53.2 |
| 15* | −46.110 | 1.45 | | |
| 16 | 24.771 | 0.60 | 1.85478 | 24.8 |
| 17 | 7.523 | 0.19 | | |
| 18 | 7.884 | 4.49 | 1.48749 | 70.2 |
| 19 | −22.795 | (Variable) | | |
| 20 | 74.207 | 1.42 | 1.94595 | 18.0 |
| 21 | −28.010 | 0.50 | 1.91082 | 35.3 |
| 22 | 12.182 | (Variable) | | |
| 23 | 14.563 | 1.50 | 1.64769 | 33.8 |
| 24 | −158.335 | 2.05 | | |
| 25 | ∞ | 2.34 | 1.51633 | 64.1 |
| 26 | ∞ | 3.20 | | |
| Image plane | ∞ | | | |

-continued

| Unit mm |
|---|
| Aspherical surface data |
| Fourteenth surface |

$K = -4.00247e-001 \quad A4 = -2.43161e-005 \quad A6 = 4.87333e-007$
$A8 = -1.08928e-009 \quad A10 = 4.32493e-011$ Fifteenth surface $K = 0.00000e+000 \quad A4 = 1.06761e-004 \quad A6 = 1.29298e-007$ Various data
Zoom ratio 5.76

| | Wide angle | Intermediate | Telephoto |
|---|---|---|---|
| Focal length | 17.17 | 47.77 | 98.94 |
| F-number | 1.85 | 1.99 | 2.85 |
| Half angle of field (degrees) | 9.91 | 3.59 | 1.74 |
| Image height | 3.00 | 3.00 | 3.00 |
| Total lens length | 82.90 | 82.90 | 82.90 |
| BF | 6.79 | 6.79 | 6.79 |
| d7 | 2.50 | 15.33 | 21.94 |
| d12 | 20.85 | 8.02 | 1.41 |
| d19 | 2.93 | 5.44 | 1.44 |
| d22 | 5.56 | 3.05 | 7.04 |

Relationships between the conditional expressions described above and various numerical values in Numerical Examples are shown in Table 1.

TABLE 1

| Conditional Expression | Example 1 | Example 2 | Example 3 | Example 4 | Example 5 | Example 6 | Example 7 | Example 8 | Example 9 |
|---|---|---|---|---|---|---|---|---|---|
| (1) | 0.525 | 0.541 | 0.399 | 0.464 | 0.291 | 0.239 | 0.476 | 0.446 | 0.428 |
| (2) | −0.526 | −0.405 | −0.629 | −0.407 | −0.309 | −0.496 | −0.463 | −0.565 | −0.513 |
| (3) | −4.387 | −3.944 | −2.990 | −5.582 | −6.089 | −4.294 | −5.924 | −4.586 | −4.168 |
| (4) | −6.453 | −6.003 | −5.990 | −6.393 | −7.938 | −8.192 | −7.281 | −6.777 | −6.508 |
| (5) | −0.575 | −0.658 | −0.642 | −0.660 | −0.367 | −0.427 | −0.397 | −0.487 | −0.592 |
| (6) | 0.131 | 0.141 | 0.136 | 0.071 | 0.142 | 0.072 | 0.201 | 0.111 | 0.158 |
| (7) | −0.846 | −0.847 | −0.814 | −0.456 | −1.129 | −0.588 | −1.464 | −0.755 | −0.657 |
| (8) | −6.453 | −6.003 | −5.990 | −6.393 | −7.938 | −8.192 | −7.281 | — | −6.508 |
| (9) | −2.794 | −3.757 | −3.185 | −2.811 | −4.223 | −3.849 | −2.657 | — | −3.046 |
| (10) | 5.794 | 5.140 | 4.442 | 3.591 | 4.165 | 4.762 | 3.998 | — | 4.978 |
| (11) | −1.122 | −1.168 | −1.348 | −1.780 | −1.906 | −1.720 | −1.821 | — | −1.307 |
| (12) | 3.712 | 3.950 | 3.843 | 4.220 | 2.913 | 3.501 | 2.894 | — | 3.850 |
| (13) | −0.575 | −0.658 | −0.642 | −0.660 | −0.367 | −0.427 | −0.397 | — | −0.592 |
| (14) | 0.646 | 0.768 | 0.865 | 1.175 | 0.699 | 0.735 | 0.724 | — | 0.773 |
| (15) | −0.368 | −0.418 | −0.523 | −0.591 | −0.592 | −0.542 | −0.723 | — | −0.451 |
| (16) | −0.305 | −0.265 | −0.374 | −0.593 | −0.398 | −0.396 | −0.612 | — | −0.365 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-259746, filed Dec. 24, 2014, and Japanese Patent Application No. 2014-259747, filed Dec. 24, 2014 which are hereby incorporated by reference herein in their entirety.

What is claimed is:
1. A zoom lens, comprising, in order from an object side to an image side:
a first lens unit having a positive refractive power;
a second lens unit having a negative refractive power;
a third lens unit having a positive refractive power; and a rear lens group including at least one lens unit,
wherein, at a telephoto end as compared to a wide angle end, an interval between the first lens unit and the second lens unit is increased, and an interval between the second lens unit and the third lens unit is reduced,
wherein an interval between adjacent lens units is changed during zooming,
wherein the first lens unit consists, in order from the object side to the image side, of a first lens sub-unit having a positive refractive power, and a second lens sub-unit having a negative refractive power over a widest air interval in the first lens unit, and
wherein the following conditional expressions are satisfied:

$0.10 < f1a/ft < 0.60$; and $-0.70 < \beta 1b/\beta 2t < -0.20$, where ft represents a focal length of the zoom lens at the telephoto end, f1$a$ represents a focal length of the first lens sub-unit, $\beta 1b$ represents a lateral magnification of the second lens sub-unit, and $\beta 2t$ represents a lateral magnification of the second lens unit at the telephoto end.

2. A zoom lens according to claim 1, further comprising an aperture stop arranged one of between the second lens unit and the third lens unit and in the third lens unit,
wherein the first lens unit, the aperture stop, and the third lens unit are configured not to move during zooming.

3. A zoom lens according to claim 1, wherein the first lens unit includes at least two positive lenses and at least one negative lens.

4. A zoom lens according to claim 1, wherein the second lens unit includes at least one positive lens and at least two negative lenses.

5. A zoom lens according to claim 1, wherein the third lens unit includes at least one positive lens and at least one negative lens, and at least one of lens surfaces of the at least one positive lens included in the third lens unit has an aspherical shape.

6. A zoom lens according to claim 1, wherein the following conditional expression is satisfied:

$-10.0 < f1a/f2 < -2.0$, where f1$a$ represents a focal length of the first lens sub-unit, and f2 represents a focal length of the second lens unit.

7. A zoom lens according to claim 1, wherein the following conditional expression is satisfied:

$-20.0 < f1/f2 < -5.0$, where f1 represents a focal length of the first lens unit, and f2 represents a focal length of the second lens unit.

8. A zoom lens according to claim 1, wherein the following conditional expression is satisfied:

$-0.80 < f2/fw < -0.30$, where f2 represents a focal length of the second lens unit, and fw represents a focal length of the zoom lens at the wide angle end.

9. A zoom lens according to claim 1, wherein the following conditional expression is satisfied:

$0.03 < Lab/f1a < 1.00$, where Lab represents an interval between the first lens sub-unit and the second lens sub-unit.

10. A zoom lens according to claim 1, wherein the following conditional expression is satisfied:

$-5.0 < Lab/f2 < -0.1$, where f2 represents a focal length of the second lens unit, and Lab represents an interval between the first lens sub-unit and the second lens sub-unit.

11. A zoom lens according to claim 1, wherein the rear lens group consists, in order from the object side to the image side, of a fourth lens unit having a negative refractive power, and a fifth lens unit having a positive refractive power.

12. A zoom lens according to claim 11, wherein during zooming from the wide angle end to the telephoto end, the second lens unit is configured to move toward the image side, and the fourth lens unit is configured to move toward the image side and then toward the object side.

13. A zoom lens according to claim 11, wherein the fourth lens unit is configured to move toward the image side during focusing from infinity to proximity.

14. A zoom lens according to claim 1, wherein the rear lens group consists of a fourth lens unit having a positive refractive power.

15. A zoom lens according to claim 14, wherein, during zooming from the wide angle end to the telephoto end, the second lens unit is configured to move toward the image side, and the fourth lens unit is configured to move toward the object side and then toward the image side.

16. A zoom lens according to claim 14, wherein the fourth lens unit is configured to move toward the object side during focusing from infinity to proximity.

17. An image pickup apparatus, comprising:
a zoom lens; and
an image pickup element configured to receive light of an image formed by the zoom lens,
the zoom lens comprising, in order from an object side to an image side:
a first lens unit having a positive refractive power;
a second lens unit having a negative refractive power;
a third lens unit having a positive refractive power; and
a rear lens group including at least one lens unit,
wherein, at a telephoto end as compared to a wide angle end, an interval between the first lens unit and the second lens unit is increased, and an interval between the second lens unit and the third lens unit is reduced,
wherein an interval between adjacent lens units is changed during zooming,
wherein the first lens unit consists, in order from the object side to the image side, of a first lens sub-unit having a positive refractive power, and a second lens sub-unit having a negative refractive power over a widest air interval in the first lens unit, and
wherein the following conditional expressions are satisfied:

$0.10 < f1a/ft < 0.60$; and $-0.70 < \beta 1b/\beta 2t < -0.20$, where ft represents a focal length of the zoom lens at the telephoto end, f1$a$ represents a focal length of the first lens sub-unit, $\beta 1b$ represents a lateral magnification of the second lens sub-unit, and $\beta 2t$ represents a lateral magnification of the second lens unit at the telephoto end.

18. A zoom lens, comprising, in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive refractive power, wherein, at a telephoto end as compared to a wide angle end, an interval between the first lens unit and the second lens unit is increased, an interval between the second lens unit and the third lens unit is reduced, an interval between the third lens unit and the fourth lens unit is changed, and an interval between the fourth lens unit and the fifth lens unit is changed, wherein, in the first lens unit, a first positive lens having a convex surface on the object side is arranged closest to the object side, and a lens arranged closest to the image side in the first lens unit has a concave surface on the image side, and wherein the following conditional expressions are satisfied:

$-10.0 < f1/f2 < -4.5$; and $-10.0 < \beta 2t < -2.0$, where f1 represents a focal length of the first lens unit, f2 represents a focal length of the second lens unit, and $\beta 2t$ represents a lateral magnification of the second lens unit at the telephoto end.

19. A zoom lens according to claim 18, wherein the first lens unit, the third lens unit, and the fifth lens unit are configured not to move during zooming.

20. A zoom lens according to claim 18, further comprising an aperture stop on the image side of the second lens unit and on the object side of a lens surface of the third lens unit closest to the image side, wherein the aperture stop is configured not to move during zooming.

21. A zoom lens according to claim 18, wherein the first lens unit includes at least two positive lenses and at least one negative lens.

22. A zoom lens according to claim 18, wherein the second lens unit includes at least one positive lens and at least two negative lenses.

23. A zoom lens according to claim 18, wherein the third lens unit includes at least one positive lens and at least one negative lens, and at least one of lens surfaces of the at least one positive lens included in the third lens unit has an aspherical shape.

24. A zoom lens according to claim 18, wherein the following conditional expression is satisfied:

$3.0 < f1/f3 < 10.0$, where f3 represents a focal length of the third lens unit.

25. A zoom lens according to claim 18, wherein the following conditional expression is satisfied:

$-2.0 < f3/f2 < -0.3$, where f3 represents a focal length of the third lens unit.

26. A zoom lens according to claim 18, wherein the following conditional expression is satisfied:

$2.0 < f1/fw < 6.0$, where fw represents a focal length of the zoom lens at the wide angle end.

27. A zoom lens according to claim 18, wherein the following conditional expression is satisfied:

$-0.80 < f2/fw < -0.30$, where fw represents a focal length of the zoom lens at the wide angle end.

28. A zoom lens according to claim 18, wherein the following conditional expression is satisfied:

$0.2 < f3/fw < 2.0$, where f3 represents a focal length of the third lens unit, and fw represents a focal length of the zoom lens at the wide angle end.

29. A zoom lens according to claim 18, wherein the following conditional expression is satisfied:

$-1.00 < \beta 3w < -0.30$, where $\beta 3w$ represents a lateral magnification of the third lens unit at the wide angle end.

30. A zoom lens according to claim 18, wherein the following conditional expression is satisfied:

$-1.00 < \beta 3t < -0.10$, where $\beta 3t$ represents a lateral magnification of the third lens unit at the telephoto end.

31. A zoom lens according to claim 18, wherein, during image-blur correction, a whole or a part of the third lens unit is configured to move in a direction having a component in a direction perpendicular to an optical axis.

32. A zoom lens according to claim 18, wherein, during zooming from the wide angle end to the telephoto end, the second lens unit is configured to move toward the image side, and the fourth lens unit is configured to move toward the image side and then toward the object side.

33. A zoom lens according to claim 18, wherein the fourth lens unit is configured to move toward the image side during focusing from infinity to proximity.

34. An image pickup apparatus, comprising:
a zoom lens; and
an image pickup element configured to receive light of an image formed by the zoom lens,
the zoom lens comprising, in order from an object side to an image side:
a first lens unit having a positive refractive power;
a second lens unit having a negative refractive power;
a third lens unit having a positive refractive power;
a fourth lens unit having a negative refractive power; and
a fifth lens unit having a positive refractive power,
wherein, at a telephoto end as compared to a wide angle end, an interval between the first lens unit and the second lens unit is increased, an interval between the second lens unit and the third lens unit is reduced, an interval between the third lens unit and the fourth lens unit is changed, and an interval between the fourth lens unit and the fifth lens unit is changed,
wherein, in the first lens unit, a first positive lens having a convex surface on the object side is arranged closest to the object side, and a lens arranged closest to the image side in the first lens unit has a concave surface on the image side, and
wherein the following conditional expressions are satisfied:

$-10.0 < f1/f2 < -4.5$; and $-10.0 < \beta 2t < -2.0$, where f1 represents a focal length of the first lens unit, f2 represents a focal length of the second lens unit, and $\beta 2t$ represents a lateral magnification of the second lens unit at the telephoto end.

* * * * *